US011734351B2

(12) United States Patent
Binkley et al.

(10) Patent No.: US 11,734,351 B2
(45) Date of Patent: Aug. 22, 2023

(54) PREDICTED DATA USE OBLIGATION MATCH USING DATA DIFFERENTIATORS

(71) Applicant: Optum, Inc., Minnetonka, MN (US)

(72) Inventors: Daniel L. Binkley, Weatogue, CT (US); Lisa A. Hodne, Buffalo, MN (US)

(73) Assignee: OPTUM, INC., Minnetonka, MN (US)

( * ) Notice: Subject to any disclaimer, the term of this patent is extended or adjusted under 35 U.S.C. 154(b) by 182 days.

(21) Appl. No.: 17/204,728

(22) Filed: Mar. 17, 2021

(65) Prior Publication Data

US 2021/0294798 A1 Sep. 23, 2021

Related U.S. Application Data

(60) Provisional application No. 62/990,510, filed on Mar. 17, 2020.

(51) Int. Cl.
*G06F 16/00* (2019.01)
*G06F 16/901* (2019.01)
(Continued)

(52) U.S. Cl.
CPC ...... *G06F 16/9024* (2019.01); *G06F 16/2272* (2019.01); *G06F 16/2457* (2019.01);
(Continued)

(58) Field of Classification Search
CPC ............. G06F 16/9024; G06F 16/2272; G06F 16/9038; G06F 16/904; G06F 16/9035; G06F 16/2457
See application file for complete search history.

(56) References Cited

U.S. PATENT DOCUMENTS 6,202,066 B1   3/2001 Barkley et al.
6,732,113 B1   5/2004 Ober et al.
(Continued)

FOREIGN PATENT DOCUMENTS

EP        2663053 A2    11/2013
WO   2016/064470 A1     4/2016

OTHER PUBLICATIONS

Final Office Action for U.S. Appl. No. 17/204,735, dated Aug. 18, 2022, (12 pages), U.S. Patent and Trademark Office, US.
(Continued)

*Primary Examiner* — Khanh B Pham
(74) *Attorney, Agent, or Firm* — Alston & Bird LLP

(57) ABSTRACT

Embodiments provide for predicted data use obligation matching using data differentiators. Embodiments retrieve one or more logical data record set identifiers associated with an intended use request. For each unique logical data record set identifier of the one or more logical data record set identifiers, a cross-link relationship graph structure comprising a plurality of cross-link relationship graph nodes and a plurality of cross-link relationship graph edges is traversed. Based at least in part on a separation measure associated with each cross-link relationship of one or more cross-link relationships associated with the unique logical data record set identifier, one or more data use obligation scores are generated for the unique logical data record set identifier. An aggregated data use obligation score is generated based at least in part on aggregating the one or more data use obligation scores for each of the unique logical data record set identifiers of the one or more logical data record set identifiers associated with the intended use request. Upon determining that the aggregated data use obligation score is below a risk threshold, the intended use request may be granted.

29 Claims, 25 Drawing Sheets

(51) Int. Cl.
  *G06F 16/9038* (2019.01)
  *G06F 16/904* (2019.01)
  *G06F 16/9035* (2019.01)
  *G06F 16/22* (2019.01)
  *G06F 16/2457* (2019.01)

(52) U.S. Cl.
  CPC ........ *G06F 16/904* (2019.01); *G06F 16/9035* (2019.01); *G06F 16/9038* (2019.01)

(56) References Cited

U.S. PATENT DOCUMENTS

| | | | |
|---|---|---|---|
| 8,738,605 | B2 | 5/2014 | Devarajan et al. |
| 9,489,376 | B2 | 11/2016 | Thomason et al. |
| 9,628,493 | B2 | 4/2017 | Warshavsky et al. |
| 9,691,027 | B1 | 6/2017 | Sawant et al. |
| 9,785,795 | B2 | 10/2017 | Grondin et al. |
| 2003/0101341 | A1 | 5/2003 | Kettler et al. |
| 2008/0162499 | A1 | 7/2008 | Connor et al. |
| 2010/0180032 | A1 | 7/2010 | Lunt |
| 2013/0291098 | A1 | 10/2013 | Chung et al. |
| 2013/0332194 | A1 | 12/2013 | D'Auria et al. |
| 2015/0142811 | A1 | 5/2015 | Henry |
| 2015/0161397 | A1 | 6/2015 | Cook et al. |
| 2016/0191512 | A1 | 6/2016 | Tatourian et al. |
| 2016/0277424 | A1 | 9/2016 | Mawji et al. |
| 2017/0091279 | A1 | 3/2017 | Shah et al. |
| 2017/0116315 | A1 | 4/2017 | Xiong et al. |
| 2017/0124176 | A1 | 5/2017 | Beznos et al. |
| 2017/0178139 | A1* | 6/2017 | Gieseke ............. G06Q 30/0185 |
| 2017/0208041 | A1 | 7/2017 | Kho et al. |
| 2017/0287029 | A1 | 10/2017 | Barday |
| 2017/0287059 | A1 | 10/2017 | Shelksohn et al. |
| 2018/0027006 | A1 | 1/2018 | Zimmermann et al. |
| 2018/0075254 | A1 | 3/2018 | Reid et al. |
| 2018/0144138 | A1* | 5/2018 | Zhang ................... G06F 21/577 |
| 2018/0232528 | A1 | 8/2018 | Williamson et al. |
| 2018/0309775 | A1 | 10/2018 | Zou et al. |
| 2018/0316722 | A1 | 11/2018 | Jenson |
| 2019/0258854 | A1 | 8/2019 | Hosabettu et al. |
| 2019/0361937 | A1 | 11/2019 | Rogynskyy et al. |
| 2020/0211124 | A1* | 7/2020 | Bhagat ................... G06Q 50/01 |
| 2021/0142220 | A1* | 5/2021 | Enuka .................... G06Q 10/10 |
| 2021/0150056 | A1* | 5/2021 | Vax ..................... G06F 16/9024 |
| 2022/0100891 | A1 | 3/2022 | Binkley et al. |

OTHER PUBLICATIONS

Final Office Action for U.S. Appl. No. 16/592,134, dated May 18, 2021, (16 pages), United States Patent and Trademark Office, USA.

"Collibra Data Governance Center," Collibra, [online], (9 pages), [Retrieved From the Internet Jun. 25, 2019] <https://www.collibra.com/data-governance-solutions/data-governance-center>.

Combined Search and Examination Report for Great Britain Patent Application No. 1914329.6, dated Mar. 19, 2020, (5 pages). United Kingdom Intellectual Property Office, Oslo, Norway.

Intellectual Property Office, Intention to Grant for Great Britain Patent Application No. GB1914329.6, dated Oct. 12, 2020, (2 pages), South Wales, Great Brtiain.

NonFinal Office Action for U.S. Appl. No. 16/400,576, filed Nov. 18, 2020, (31 pages), United States Patent and Trademark Office, U.S.

Notice of Allowance and Fee(s) Due for U.S. Appl. No. 16/400,476, filed Mar. 19, 2021, (17 pages), United States Patent and Trademark Office, US.

Corrected Notice of Allowability for U.S. Appl. No. 16/400,476, dated Jun. 3, 2021, (7 pages), United States Patent and Trademark Office, USA.

International Searching Authority, International Search Report and Written Opinion for International Application No. PCT/US2021/022835, dated Jun. 7, 2021, (14 pages), European Patent Office, Rijswijk, Netherlands.

International Searching Authority, International Search Report and Written Opinion for International Application No. PCT/US2021/022850, dated Jun. 7, 2021, (16 pages), European Patent Office, Rijswijk, Netherlands.

NonFinal Office Action for U.S. Appl. No. 17/204,735, dated Feb. 16, 2022, (30 pages), United States Patent and Trademark Office, USA.

NonFinal Office Action for U.S. Appl. No. 16/592,134, dated Feb. 4, 2021, (25 pages), United States Patent and Trademark Office, USA.

Notice of Allowance and Fee(s) Due for U.S. Appl. No. 17/204,735, dated Jan. 26, 2023, (12 pages), United States Patent and Trademark Office, US.

NonFinal Office Action for U.S. Appl. No. 17/546,728, dated Nov. 10, 2022, (14 pages), United States Patent and Trademark Office, U.S.

Notice of Allowance and Fee(s) Due for U.S. Appl. No. 17/546,728, dated Apr. 26, 2023, (13 pages), United States Patent and Trademark Office, US.

* cited by examiner

400

DATASET DETAILS

| PRODUCTION DATASET NAME | PRODUCTION DATASET DESCRIPTION | DATASET CODE | | DATASET PUBLISH DATE | | X CANCEL | SAVE AS DRAFT | PUBLISH |
|---|---|---|---|---|---|---|---|---|
| XXXXX SHIP | XXXXXX SHIP | XXXXX | | XXXXX | | | | |

DATASET CONSUMPTION ROLES     DATASET INGESTION ROLES

| IT OWNER | DATA STEWARD | BUSINESS OWNER | INFORMATION OWNER |
|---|---|---|---|

VOLUME

VOLUME TITLE     DESCRIPTION     ATTACHED ASSETS

NO RECORDS AVAILABLE!

DATA TRACKING

RECORD COUNT   0

| ENTITY | LINE OF BUSINESSES | DOMAINS |
|---|---|---|
| ☐ BUSINESS SEGMENT 1 | ☐ LINE OF BUSINESS 1 | ☐ DOMAIN 1 |
| ☐ BUSINESS SEGMENT 2 | ☐ LINE OF BUSINESS 2 | ☐ DOMAIN 2 |
| ☐ BUSINESS SEGMENT 3 | ☐ LINE OF BUSINESS 3 | ☐ DOMAIN 3 |
|  | ☐ LINE OF BUSINESS 4 | ☐ DOMAIN 4 |
|  | ☐ LINE OF BUSINESS 5 | ☐ DOMAIN 5 |
|  | ☐ LINE OF BUSINESS 6 | ☐ DOMAIN 6 |

INTERNAL SENSITIVITY
CONTAINS EMPLOYEE DATA

☐ HEALTHCARE HC
BUSINESS SEGMENT     LINE OF BUSINESS

| ☐ BUSINESS SEGMENT 1 | ☐ LINE OF BUSINESS 1 |
|---|---|
| ☐ BUSINESS SEGMENT 2 | ☐ LINE OF BUSINESS 2 |
| ☐ BUSINESS SEGMENT 3 | |
| ☐ BUSINESS SEGMENT 4 | |
| ☐ BUSINESS SEGMENT 5 | |

FIG. 4

VOLUME DETAILS 500

| PRODUCTION VOLUME NAME | PRODUCTION VOLUME DESCRIPTION | METADATA ID | VOLUME PUBLISH DATE | | |
|---|---|---|---|---|---|
| XX-XXXX SHIP | XX-XXXX SHIP | XXXXX | XXXXX | X CANCEL | SAVE AS DRAFT | PUBLISH |

VOLUME CONSUMPTION ROLES

| IT OWNER | DATA STEWARD | | VOLUME INGESTION ROLES | |
|---|---|---|---|---|
| OWNER 1 | DATA STEWARD 1 | | BUSINESS OWNER | INFORMATION OWNER |
| | | | BUSINESS OWNER 1 | INFORMATION OWNER 1 |

VOLUME

| VOLUME TITLE | DESCRIPTION |
|---|---|
| NO RECORDS AVAILABLE | |

ASSETS

| | ASSET ID | ACCESS PROVISION | VALIDATION |
|---|---|---|---|
| ASSET NAME | XXXXXX | OTHER | NOT COMPLETE |
| ASSET NAME 1 | | | |

ATTACHED ASSETS

KEY CONTROLS X
KEY CONTROLS X
KEY CONTROLS X

« ‹ 1 › » PAGE SIZE 5 ▾

DATASETS

| ID | NAME | DATE PUBLISHED | DATA STEWARD | DGTS RECORDS COUNT | DATA CLASSIFICATION | |
|---|---|---|---|---|---|---|
| XXXXXXXXXXXX | DST 1 | 12/14/1817 2:48:54 | DATA STEWARD 1 | 0 | PROTECTED | X |
| XXXXXXXXXXXX | DST 2 | 12/15/1817 6:15:27 | DATA STEWARD 2 | 0 | PROTECTED | X |

« ‹ 1 › » PAGE SIZE 5 ▾

FIG. 5

ATTACH ASSET

ID NUMBER
[XXXXXXXX] [X]

FORMAL NAME
[FORMAL NAME 1]

BUSINESS OWNER
[BUSINESS OWNER 1]

IT OWNER
[IT OWNER 1]

ACCESS PROVISION
[OTHER]

| | MANAGE PERMISSIONS-DATASET | | | | | | | | |
|---|---|---|---|---|---|---|---|---|---|
| PRODUCTION VOLUME/DATASET TITLE | | DATA | | | PRODUCTION VOLUME/DATASET DESCRIPTION | | | | |
| XXXXXXXXXXXXXXX | | XXXXXXXXXXXXXXX | | | XXXXXXX | | | | |
| ASSET | PERMISSIONS STATUS | PERMISSIONS DATA | PUBLISH | ALLOWED ACCOUNTS | ENVIRONMENT | PROTECTION CONSUMPTION PROFILE | TIME LIMIT | OFFSHORE | RECORD AUTH |
| ASSET 1 | | | | ALLOWED | PRODUCTION | | | | |

« ‹ 1 › » PAGE SIZE 5 ▾       0 ITEMS IN 1 PAGES

[REFRESH]                                    [+ ADD PERMISSION]

PERMISSIONS OF USE DETAILS (REFRESH REQUIRED AFTER EDIT)

| | VOLUME | ASSETS | PERMISSION PUBLISH DATE |
|---|---|---|---|
| GROUP ROLE 1 | VOLUME 1 | ASSET 1 | DATE |

ALLOWED CONSUMPTION

| ALLOWED CONSUMPTION | ALLOWED ENVIRONMENTS | |
|---|---|---|
| ALLOWED ACCOUNT TYPE | NON PRODUCTION | |

| ALLOWED ACCESS | ALLOWED USE | USE JUSTIFICATION |
|---|---|---|
| ALLOWED ACCESS 1 | ALLOWED USE 1 | USE JUSTIFICATION 1 |
| ALLOWED ACCESS 2 | ALLOWED USE 2 | USE JUSTIFICATION 2 |
| ALLOWED ACCESS 3 | ALLOWED USE 3 | USE JUSTIFICATION 3 |

| OFFSHORE ALLOWED | PROTECTION CONSUMPTION PROFILE | RECORD AUTHORIZATION |
|---|---|---|
| | ALL VALUES CLEAR | RECORD AUTHORIZATION ENGINE |

| DATA USE AND RIGHTS MANUAL ENTRY | ADD DELETE | DUR# | START ACCESS | END ACCESS |
|---|---|---|---|---|
| MANUAL ENTRY 1 | | NO ACCESS AVAILABLE | | |

LEARNED SOURCE

COURSE NAME [          ]   COURSE LINK [          ]

PROPER USE LOOKUP - PROVISION GUIDANCE

SEARCH [ROLE ▼] [___] AND [ROLE ▼] [___] AND [ROLE ▼] [___] [X CLEAR]

| ROLE | ASSET | CNTRL LEVEL | ALLOWED ACCOUNTS | ENVIRONMENT | PROTECTION CONSUMPTION PROFILE | TIME LIMITED | OFFSHORE | RECORD AUTH. |
|---|---|---|---|---|---|---|---|---|
| ROLE 1 | ASSET 1 | VOLUME | END USER | PRODUCTION | PROFILE 1 | YES | ALLOWED | RECORD AUTH. 1 |
| ROLE 2 | ASSET 2 | VOLUME | END USER | PRODUCTION | PROFILE 2 | YES | ALLOWED | RECORD AUTH. 1 |
| ROLE 3 | ASSET 3 | VOLUME | END USER | PRODUCTION | PROFILE 3 | YES | ALLOWED | RECORD AUTH. 1 |
| ROLE 4 | ASSET 4 | VOLUME | END USER | PRODUCTION | PROFILE 4 | YES | ALLOWED | RECORD AUTH. 1 |
| ROLE 5 | ASSET 5 | VOLUME | END USER | PRODUCTION | PROFILE 5 | YES | ALLOWED | RECORD AUTH. 1 |

|« ‹ 1 › »|  PAGE SIZE  5 ▼   0 ITEMS IN 1 PAGES

SELECTED ROLES GRANTED CONTENT

ROLE  PRODUCTION VOLUME [XXXXXX] [XXXXXX]   METADATA ID [XXXXXX]   PRODUCTION VOLUME DESCRIPTION [VOLUME FOR TEST]

| ATTACHED DATASETS | NAME | DATA CLASSIFICATION | BUISNESS | SEGMENT | LINE OF BUSINESS |
|---|---|---|---|---|---|
| DATASETS 1 | NAME 1 | DATA CLASSIFICATION 1 | BUSINESS 1 | SEGMENT 1 | LINE OF BUSINESS 1 |
| DATASETS 2 | NAME 2 | DATA CLASSIFICATION 2 | BUSINESS 2 | SEGMENT 2 | LINE OF BUSINESS 2 |
| DATASETS 3 | NAME 3 | DATA CLASSIFICATION 3 | BUSINESS 3 | SEGMENT 3 | LINE OF BUSINESS 3 |

APPROVED DATA USE AND RIGHTS

| DUR# | START ACCESS | END ACCESS |
|---|---|---|
| XXXXXX | DATE | AGGREGATION |

ALLOWED CONSUMPTIONS

| ALLOWED ACCESS | ALLOWED USE |
|---|---|
| DISCOVERY | ALLOWED USE |

ALLOWED JUSTIFICATIONS

| USE JUSTIFICATIONS |
|---|
| TREATMENT |

DATA USE - CUSTOMER CONTRACTIONAL OBLIGATIONS AND SUMMARY (RESTRICTIONS EXIST)
- RESTRICTION 1
- RESTRICTION 2
- RESTRICTION 3
- RESTRICTION 4
- RESTRICTION 5
- RESTRICTION 6
- RESTRICTION 7

DIPOSITON SHOWN: GRAND SUMMARY NOT PERMITTED OR RESTRICTED

| CUSTOMER NAME | CMDM ID |
|---|---|
| CUSTOMER 1 | |
| CUSTOMER 2 | |
| CUSTOMER 3 | |
| CUSTOMER 4 | |
| CUSTOMER 5 | |
| CUSTOMER 6 | |
| CUSTOMER 7 | |

RECORD COUNT [XXXXXXX] PERMITTED

| CUSTOMER NAME | CMDM ID |
|---|---|
| CUSTOMER 1 | |
| CUSTOMER 2 | |
| CUSTOMER 3 | |
| CUSTOMER 4 | |
| CUSTOMER 5 | |
| CUSTOMER 6 | |
| CUSTOMER 7 | |

PERSONAL DETAIL

| PERSONA NAME | PERSONA DESCRIPTION | PERSONAL CODE | PERSONAL PUBLISH DATE | [X CLOSE] [SAVE AS DRAFT] [PUBLISH] |
|---|---|---|---|---|
| TEST PERSONAL | | XXXXXXXXXX | | |

ALLOWED USAGE (MATCH PERMISSIONS OF USE)

| ALLOWED ENVIRONMENTS | PROTECTION CONSUMPTION PROFILE (OPTIONAL) | RECORD AUTHORIZATION (OPTIONAL) |
|---|---|---|
| NON-PRODUCTION ▼ | PIII ▼ | NO RECORD ENFORCEMENT ▼ |

| ALLOWED ACCESSES (BASED ON ACNT.) | ALLOWED USE (BASED ON ALLOWED ACCESS) | USE JUSTIFICATION |
|---|---|---|
| ☒ CUSTOMER 1 | ☒ CUSTOMER 1 | ☒ CUSTOMER 1<br>☒ CUSTOMER 2<br>☒ CUSTOMER 3<br>☒ CUSTOMER 4 |

POSITION PROFILE (MATCH USER IDENTITY)

⊙ MATCH ON BUSINESS SEGMENT   ⊙ MATCH ON LINE OF BUSINESS   ⊙ MATCH ON DOMAIN

| MARKET | BUSINESS SEGMENT - EXTERNAL | LINES OF BUSINESS | DOMAIN/SUBJECT AREA |
|---|---|---|---|
| ☒ MARKET 1<br>☒ MARKET 2<br>☐ MARKET 3 | ☒ BUSINESS SEGMENT 1<br>☒ BUSINESS SEGMENT 2<br>☐ BUSINESS SEGMENT 3 | ☒ LINES OF BUSINESS 1<br>☒ LINES OF BUSINESS 2<br>☐ LINES OF BUSINESS 3<br>☐ LINES OF BUSINESS 4<br>☒ LINES OF BUSINESS 5<br>☐ LINES OF BUSINESS 6 | ☒ DOMAIN 1<br>☒ DOMAIN 2<br>☐ DOMAIN 3<br>☐ DOMAIN 4<br>☒ DOMAIN 5<br>☐ DOMAIN 6 |

ALLOWED DATA (MATCH DATA IDENTITY)

⊙ ALLOW OTHER MARKETS   ⊙ ALLOW OTHER BUSINESS SEGMENTS   ⊙ ALLOW OTHER LINES OF BUSINESS   ⊙ ALLOW OTHER DOMAINS

| MARKET | BUSINESS SEGMENT - EXTERNAL | LINES OF BUSINESS | DOMAIN/SUBJECT AREA |
|---|---|---|---|
| ☒ MARKET 1<br>☒ MARKET 2 | ☒ BUSINESS SEGMENT 1<br>☒ BUSINESS SEGMENT 2<br>☐ BUSINESS SEGMENT 3 | ☒ LINES OF BUSINESS 1<br>☒ LINES OF BUSINESS 2<br>☐ LINES OF BUSINESS 3<br>☐ LINES OF BUSINESS 4<br>☒ LINES OF BUSINESS 5<br>☐ LINES OF BUSINESS 6 | ☒ DOMAIN 1<br>☒ DOMAIN 2<br>☐ DOMAIN 3<br>☐ DOMAIN 4<br>☒ DOMAIN 5<br>☐ DOMAIN 6 |

⊙ ALLOW EMPLOYEE DATA

MY DATA RIGHTS

| FULL NAME: | MSID: | | MARKET GROUP: |
|---|---|---|---|
| TITLE: | EMPLOYEE ID: | | EXTERNAL SEGMENT: |
| COUNTRY: | ONSHORE/OFFSHORE UNDEFINED | | INTERNAL SEGMENT: |
| LOCATION: | EMPLOYEE/CONTRACTOR | | BUSINESS: |
| | REGULAR/TEMP | | DIVISION: |

SELECTION GRID

FILTER | AND | AND
ROLE ▼ [  ] | ROLE ▼ [  ] | ROLE ▼ [  ]  X CLEAR

| ROLE | ASSET | COI LEVEL | ALLOWED ACCOUNTS | ENVIRONMENT | PROTECTION CONSUMPTION PROFILE | TIME LIMITED DURS | OFFSHORE | RECORD AUTH |
|---|---|---|---|---|---|---|---|---|

« ‹ 1 › »  PAGE SIZE  5    0 ITEMS IN 1 PAGES

SELECTION ROLE'S GRANTED CONTENT

| ROLE | PRODUCTION VOLUME | METADATA ID | PRODUCTION VOLUME DESCRIPTION |
|---|---|---|---|

ATTACHED DATA SHEETS

| DATASET ID | NAME | DATA CLASSIFICATION |
|---|---|---|
| NO RECORDS AVAILABLE! | | |

BUSINESS

| MARKET | SEGMENT | LINE OF BUSINESS |
|---|---|---|
| NO RECORDS AVAILABLE! | | |

APPROVED DATA USE AND RIGHTS (DURS)

| DUR# | START ACCESS | END ACCESS |
|---|---|---|
| NO RECORDS AVAILABLE! | | |

ALLOWED CONSUMPTIONS

| ALLOWED ACCESS | ALLOWED ACCESS |
|---|---|
| NO RECORDS AVAILABLE! | |

ALLOWED CONSUMPTIONS

| USE JUSTIFICATION |
|---|
| NO RECORDS AVAILABLE! |

PREDICTED DATA USE OBLIGATION MATCH USING DATA DIFFERENTIATORS

CROSS-REFERENCE TO RELATED APPLICATIONS

The present application claims priority to U.S. Provisional Application Ser. No. 62/990,510, titled "PREDICTED DATA USE OBLIGATION MATCH USING DATA DIFFERENTIATORS," filed Mar. 17, 2020, the contents of which are incorporated herein by reference in their entirety.

TECHNOLOGICAL FIELD

Example embodiments of the present disclosure relate to controlling and tracking access to data in a computing system.

BACKGROUND

Data governance is a capability that ensures important data sets are governed and secured properly. The key to data governance is identifying what data sets are being accessed, where data sets are being accessed from, why data sets are being accessed and who or what entity is accessing the data sets. Legal, regulatory or contractual obligations apply to data regardless of the technology storing, processing or transmitting data. Furthermore, the use and appropriate protection of data, such as healthcare records, are complex. Data records can be subject to regulatory, business contract, business strategic and internal company-based use obligations. Accordingly, there exists a dire need for solutions, example embodiments of which are presented herein.

SUMMARY

Embodiments provide for predicted data use obligation matching using data differentiators. Example embodiments retrieve a cross-link relationship graph structure from a data repository, where the cross-link relationship graph structure includes a plurality of cross-link relationship graph nodes connected by a plurality of cross-link relationship graph edges. Each cross-link relationship graph node is associated with a unique logical data record set identifier of a plurality of logical data record set identifiers associated with a dataset identifier. For each unique logical data record set identifier, the cross-link relationship graph structure is traversed. Based at least in part on a separation measure associated with each cross-link relationship of one or more cross-link relationships associated with the unique logical data record set identifier, one or more data use obligation scores for the unique logical data record set identifier is generated.

Embodiments further retrieve, from a repository, one or more logical data record set identifiers associated with an intended use request, the intended use request associated with an intended use identifier. For each unique logical data record set identifier of the one or more logical data record set identifiers, a cross-link relationship graph structure comprising a plurality of cross-link relationship graph nodes and a plurality of cross-link relationship graph edges is traversed. Based at least in part on a separation measure associated with each cross-link relationship of one or more cross-link relationships associated with the unique logical data record set identifier, one or more data use obligation scores are generated for the unique logical data record set identifier. An aggregated data use obligation score is generated based at least in part on aggregating the one or more data use obligation scores for each of the unique logical data record set identifiers of the one or more logical data record set identifiers associated with the intended use request. Upon determining that the aggregated data use obligation score is below a risk threshold, the intended use request may be granted.

Various other aspects are also described in the following detailed description and in the attached claims.

BRIEF DESCRIPTION OF THE DRAWINGS

Figure 1:
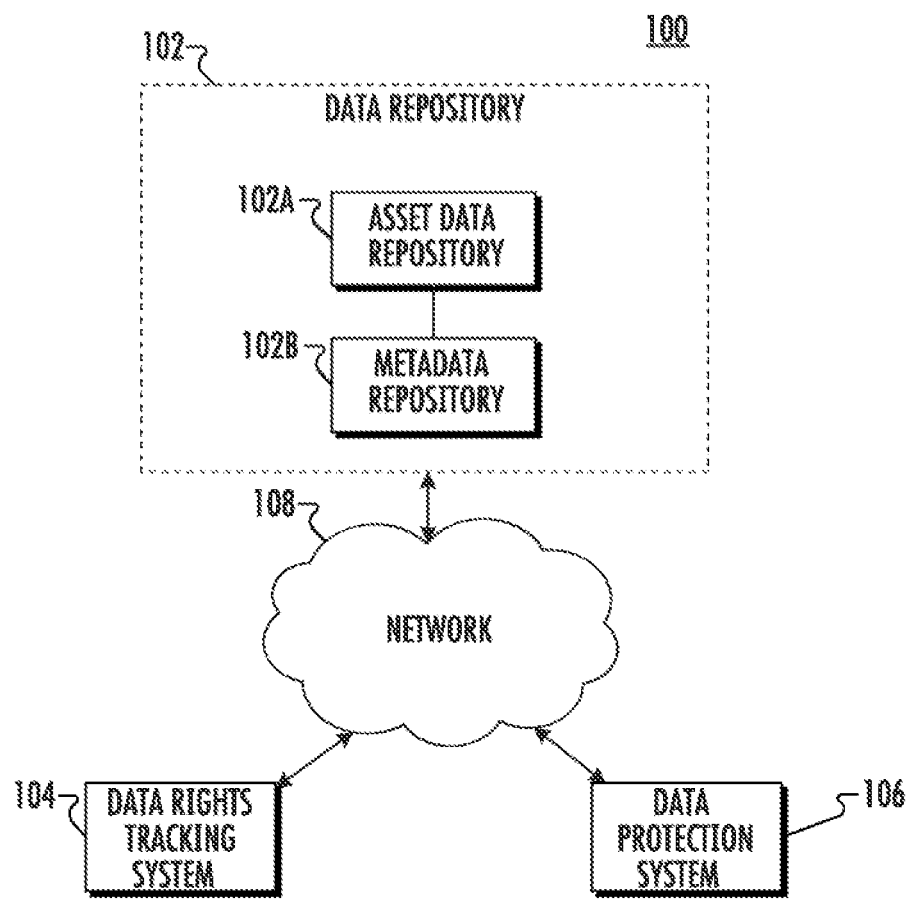
Figure 2:
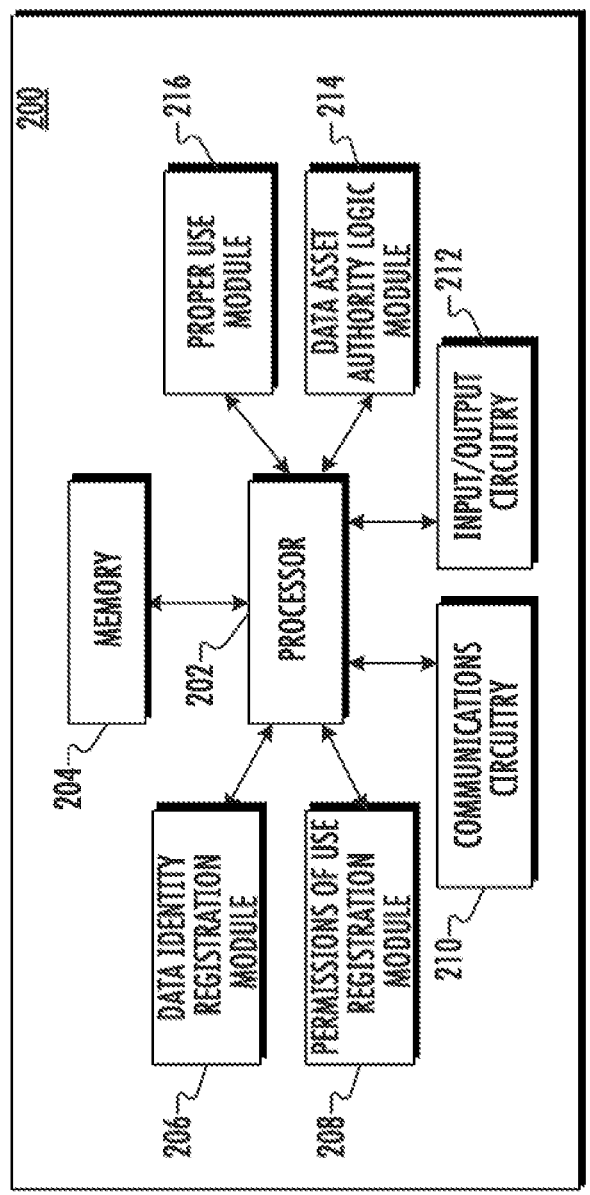
Figure 3:
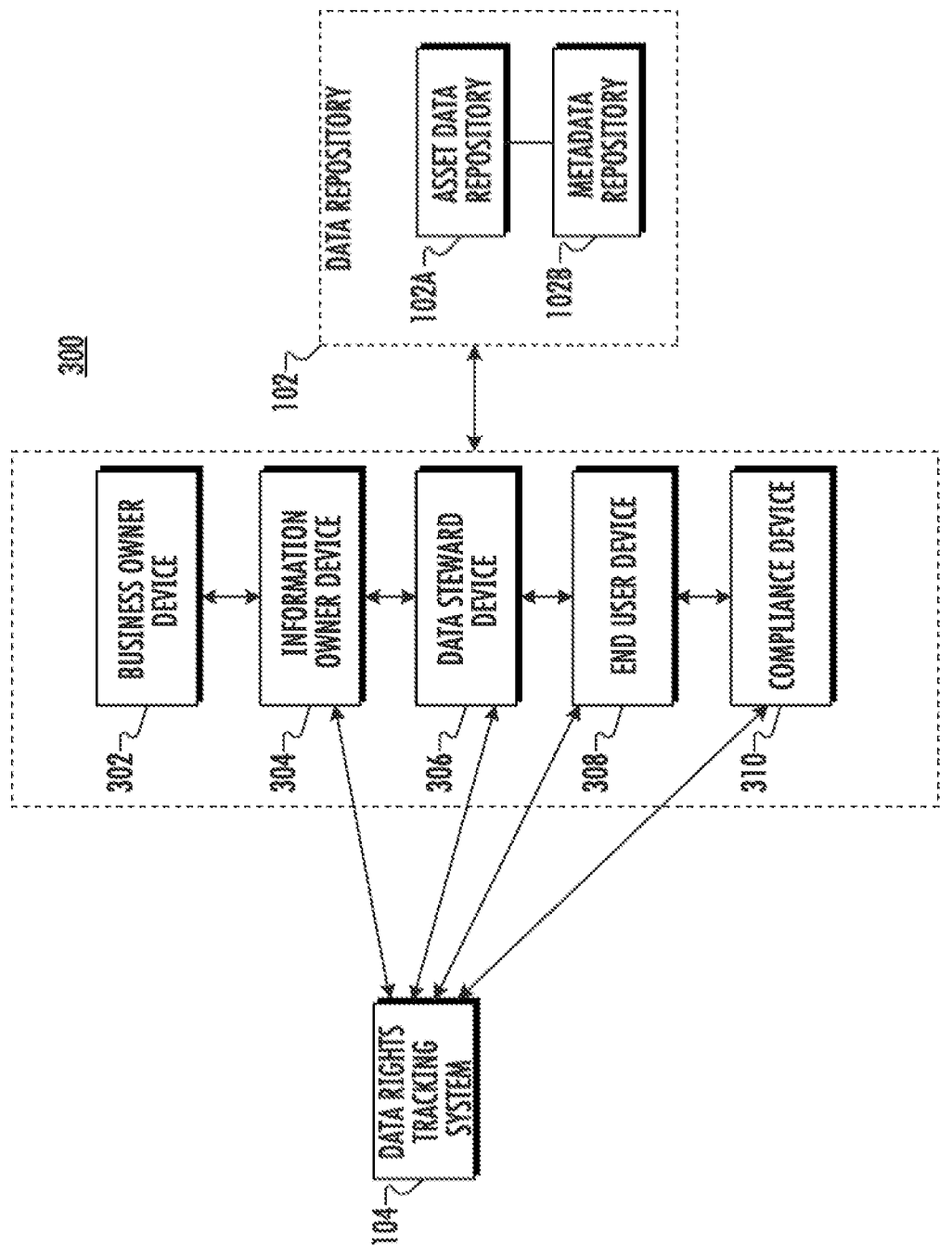
Figure 11:
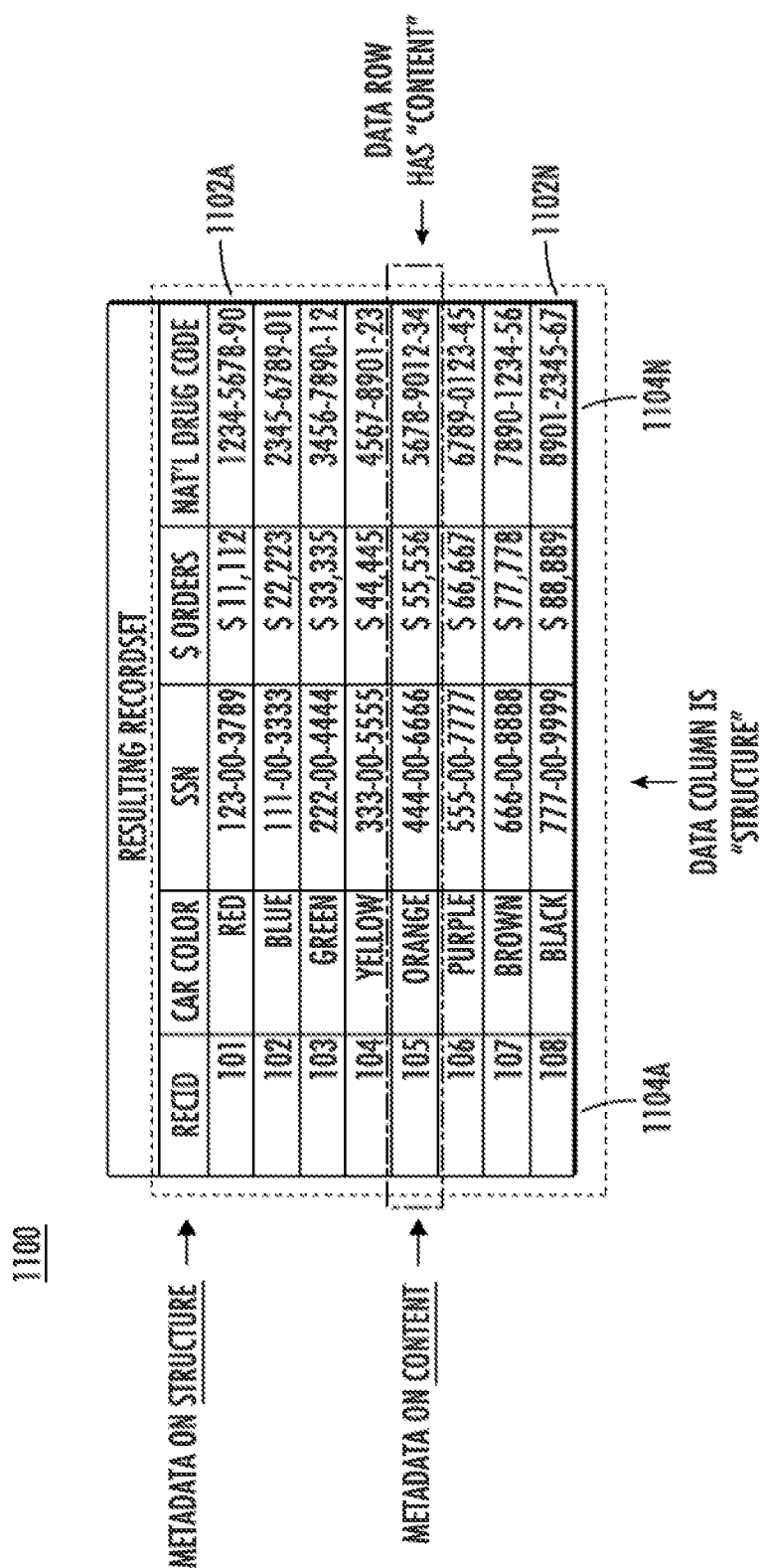
Figure 12:
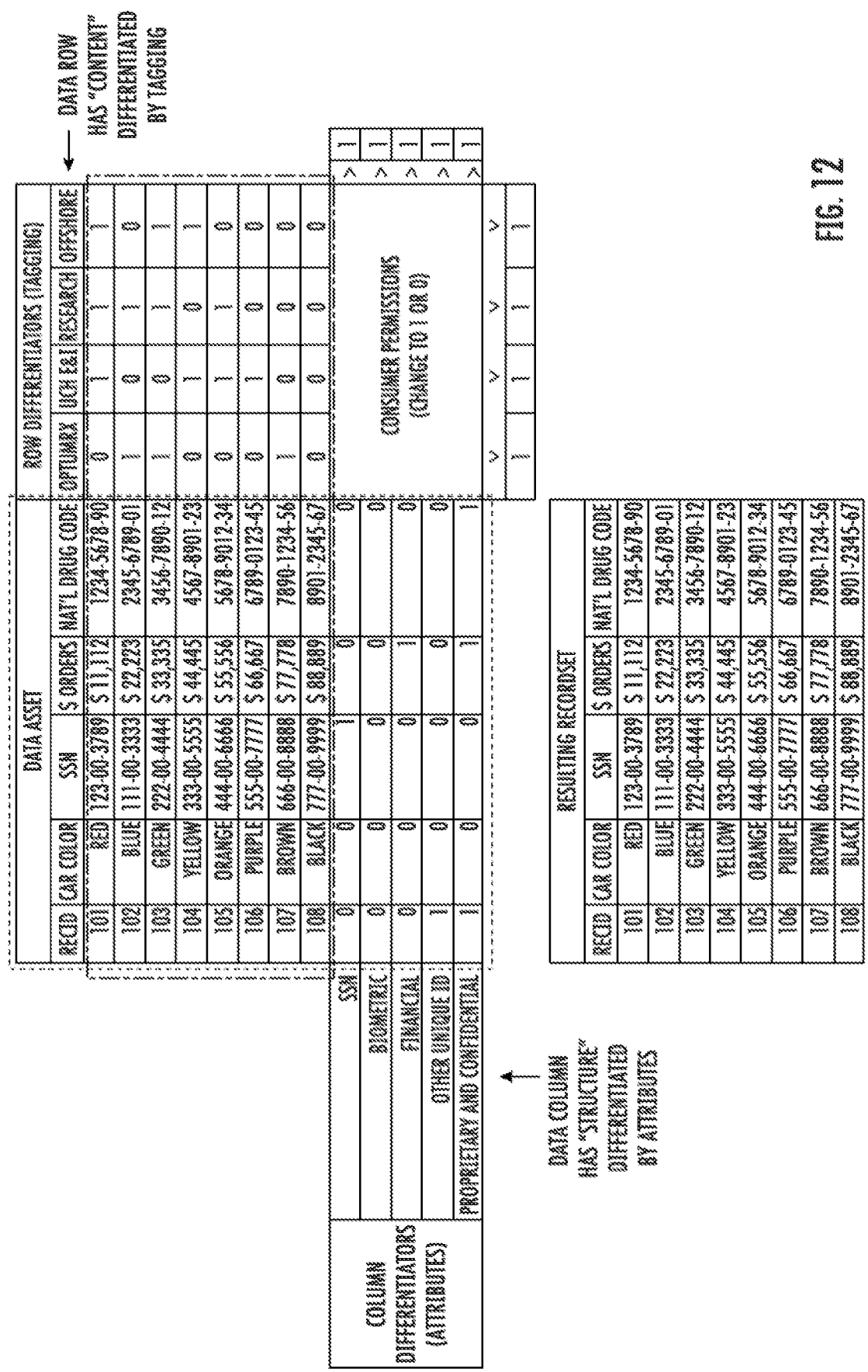
Figure 13:
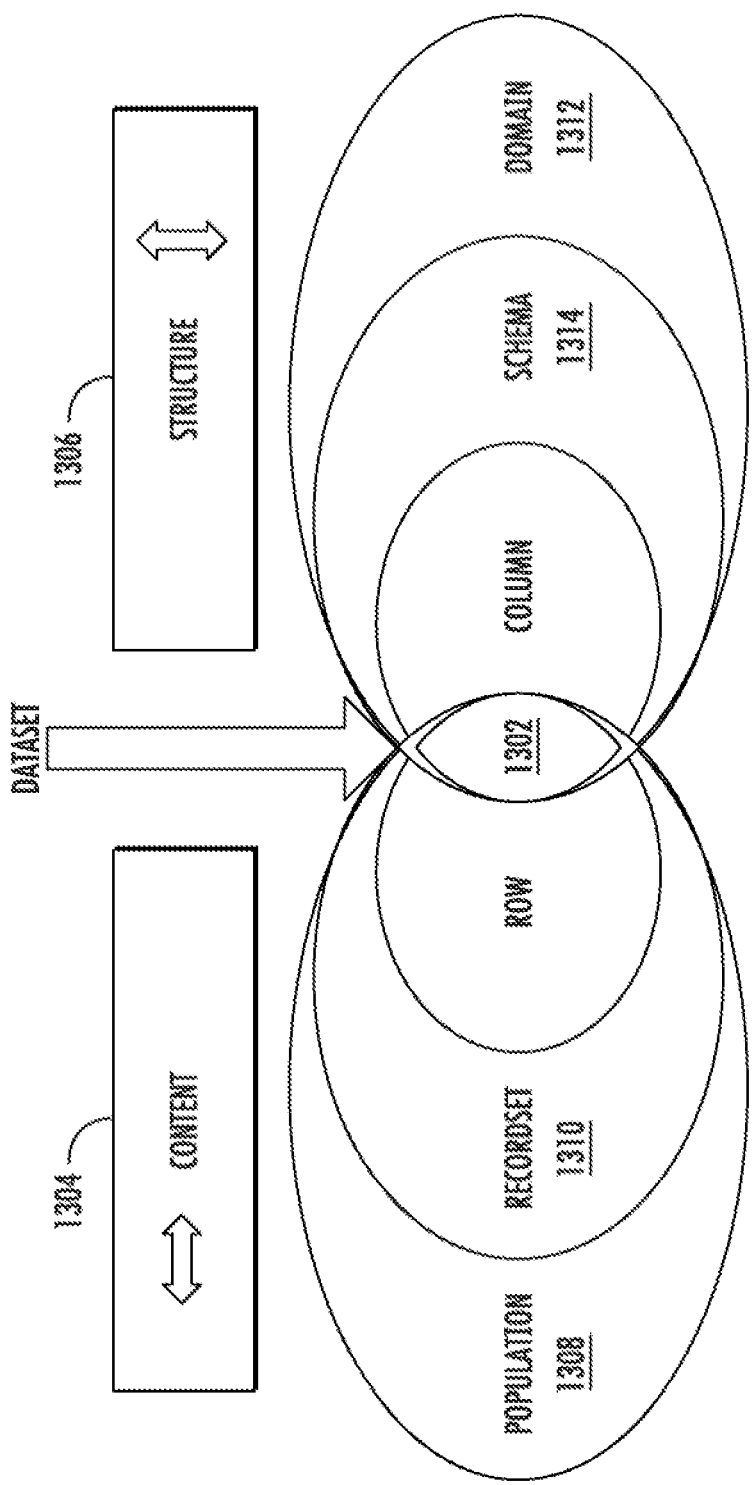
Figure 14:
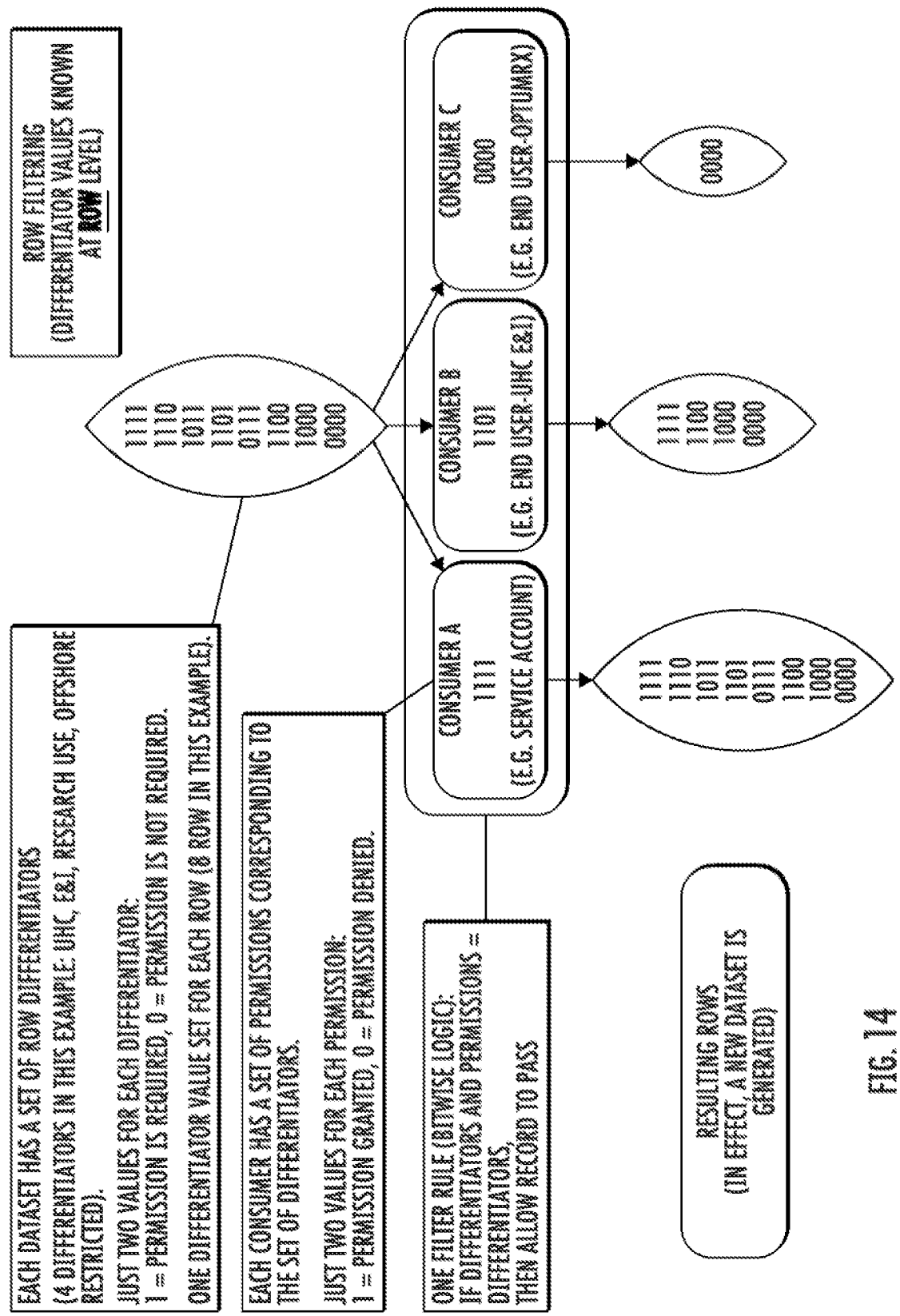
Figure 15:
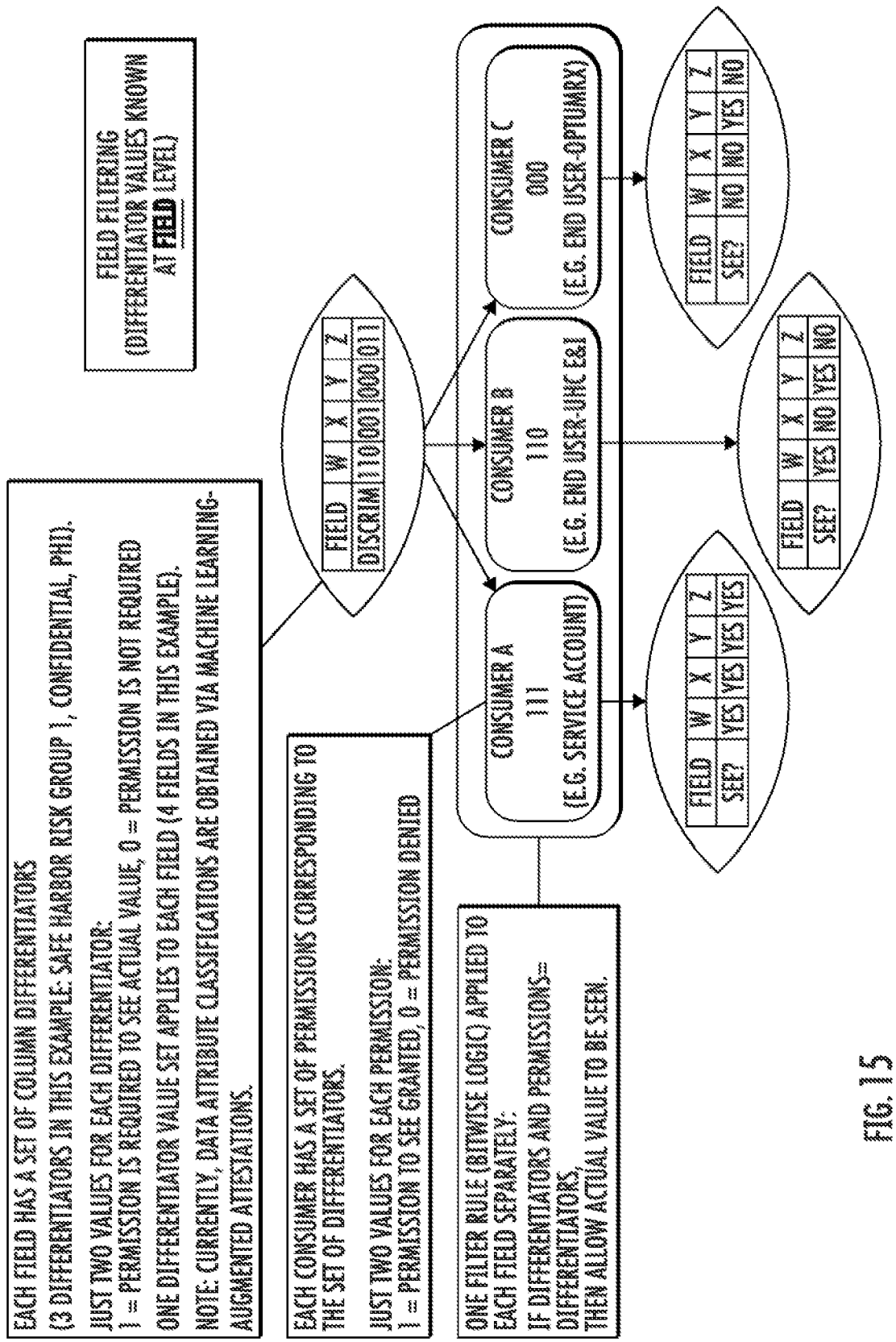
Figure 16:
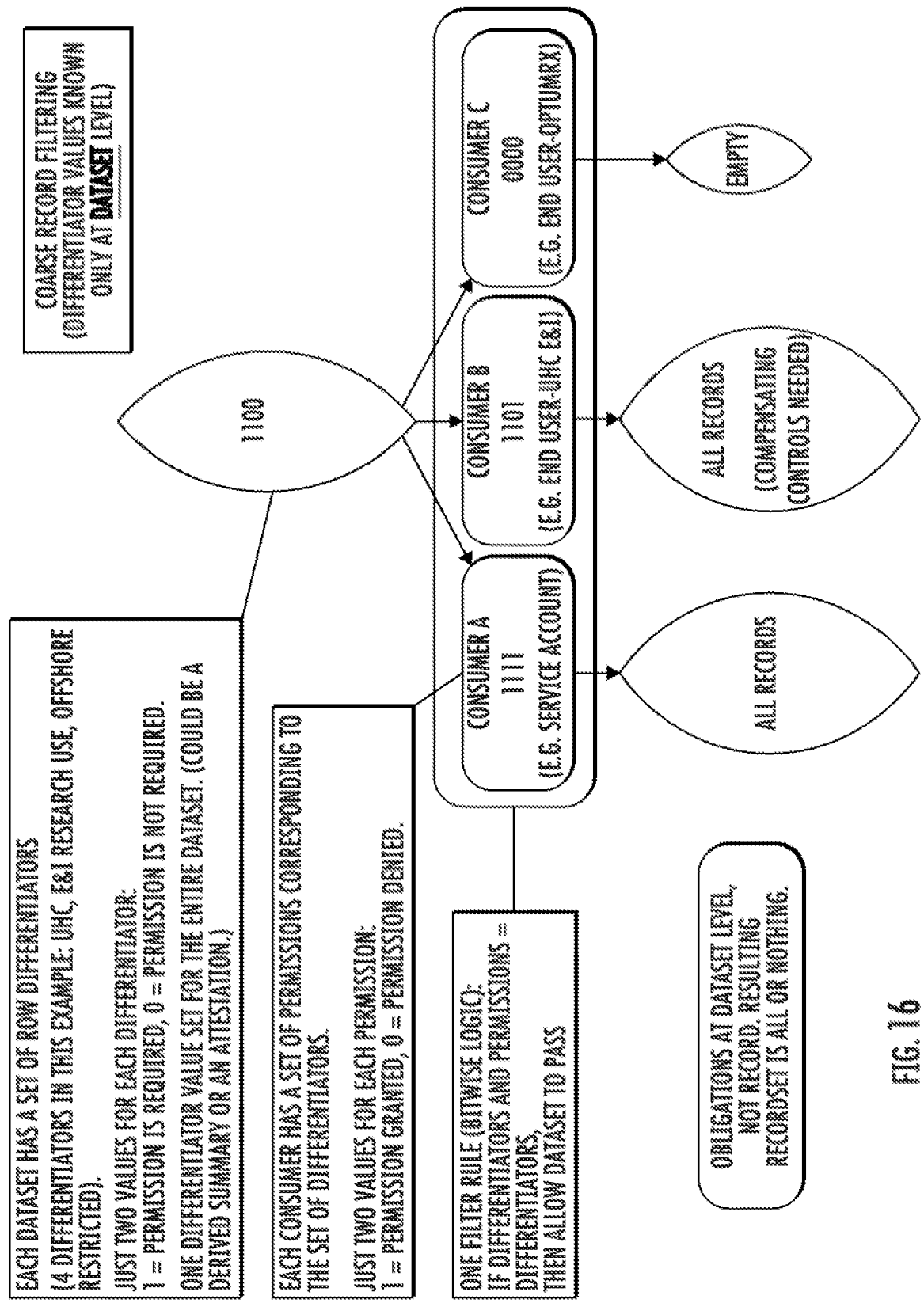
Figure 17:
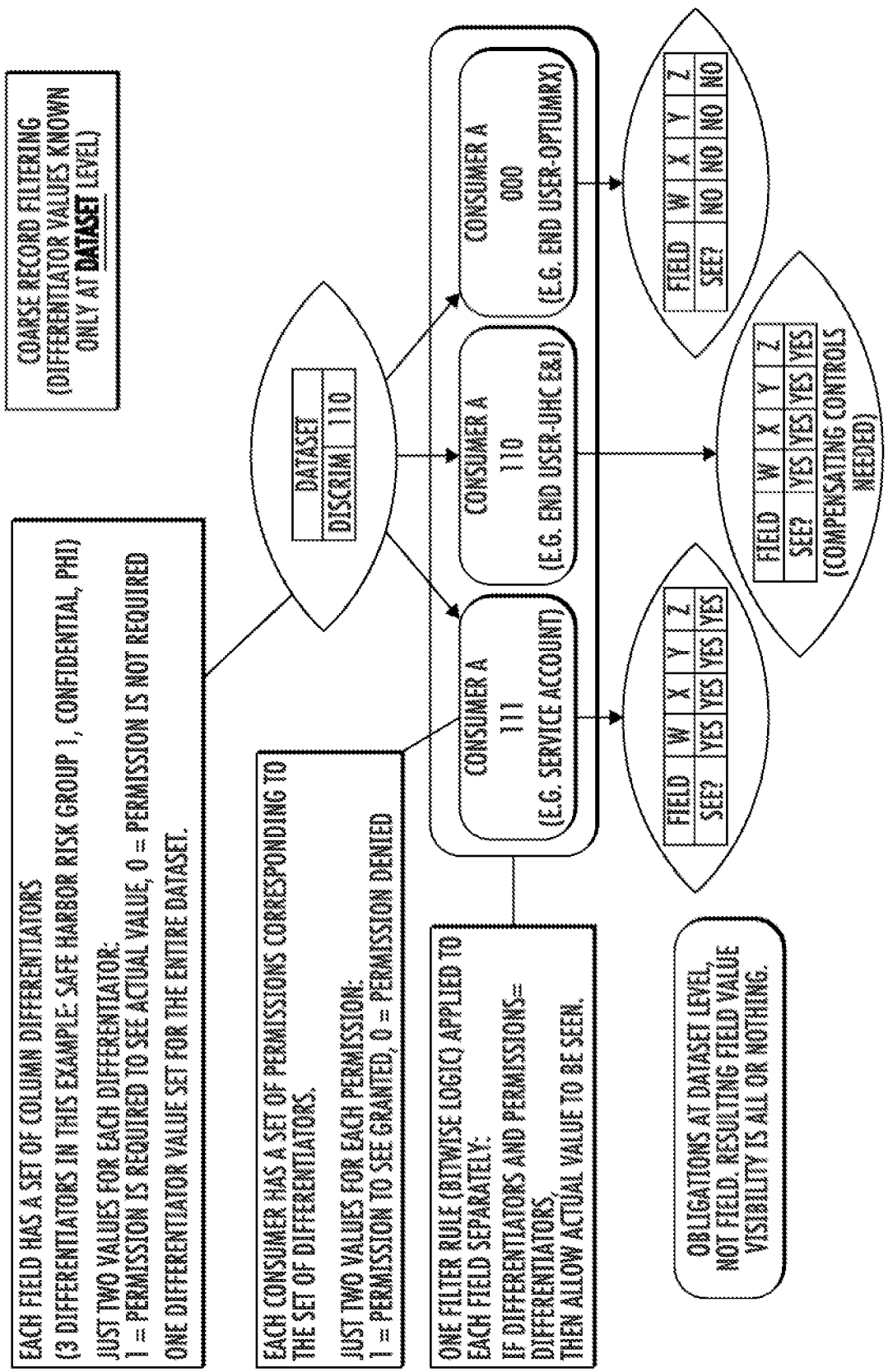
Figure 18:
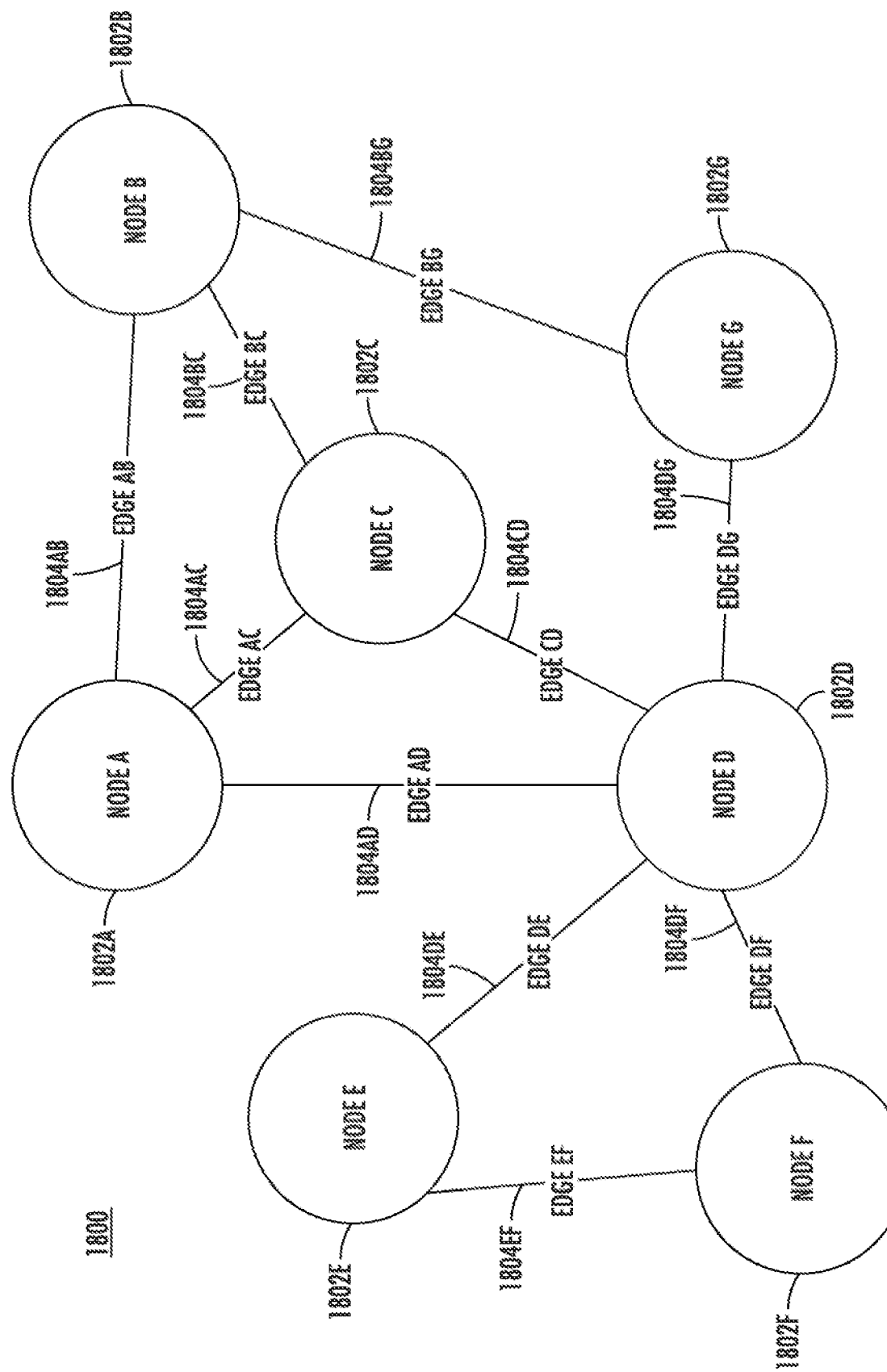
Figure 19:
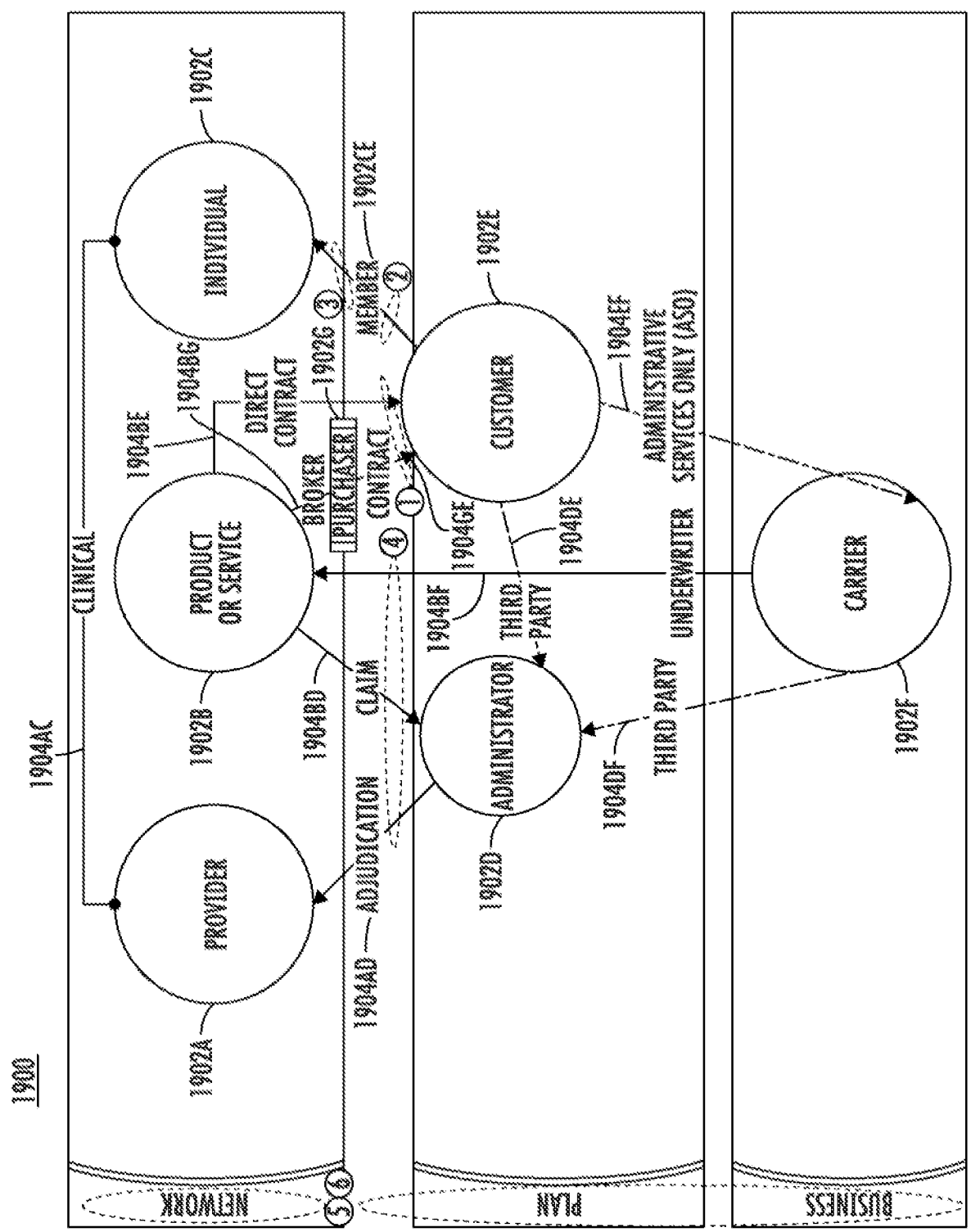
Figure 20:
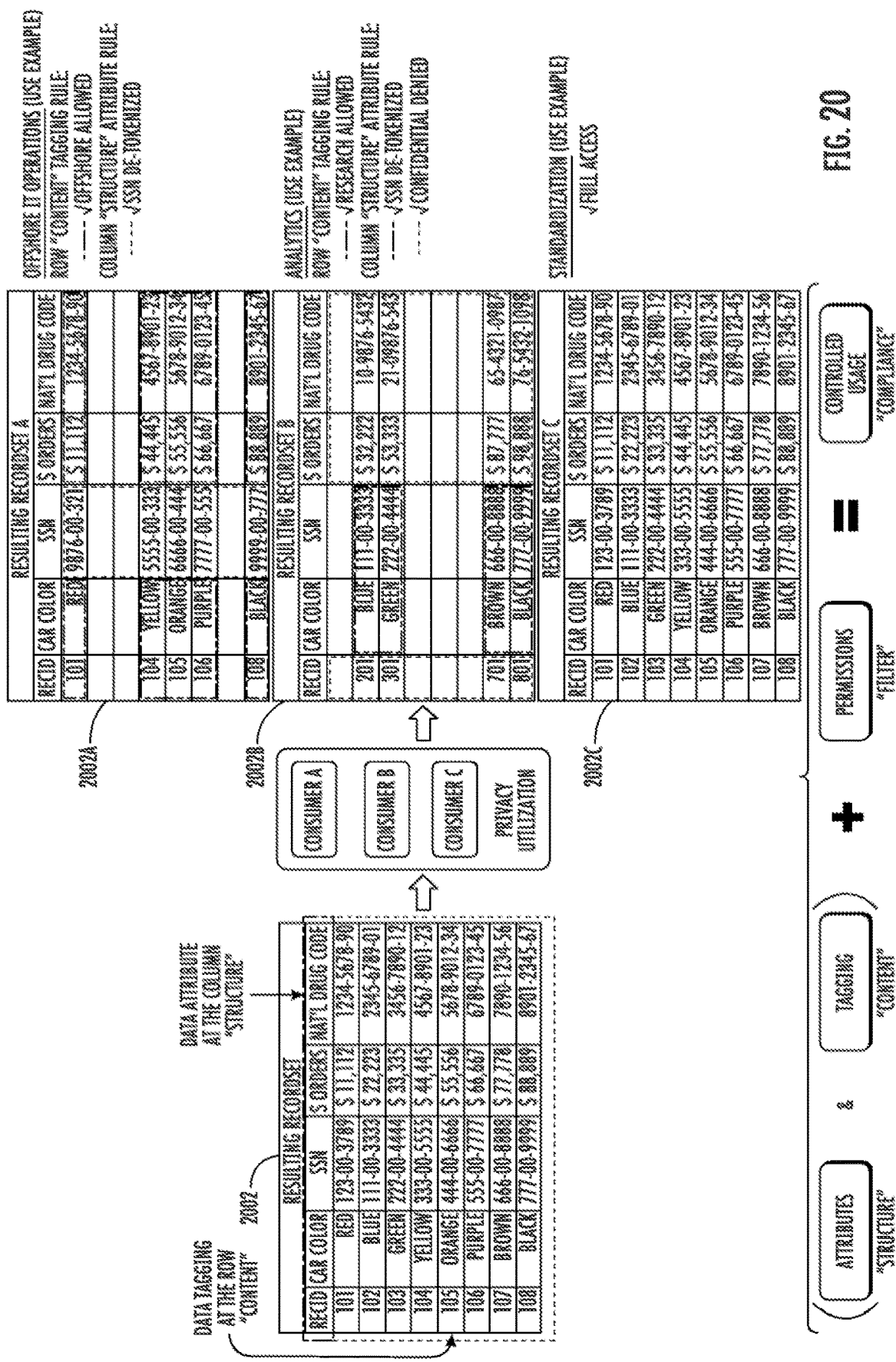
Figure 21:
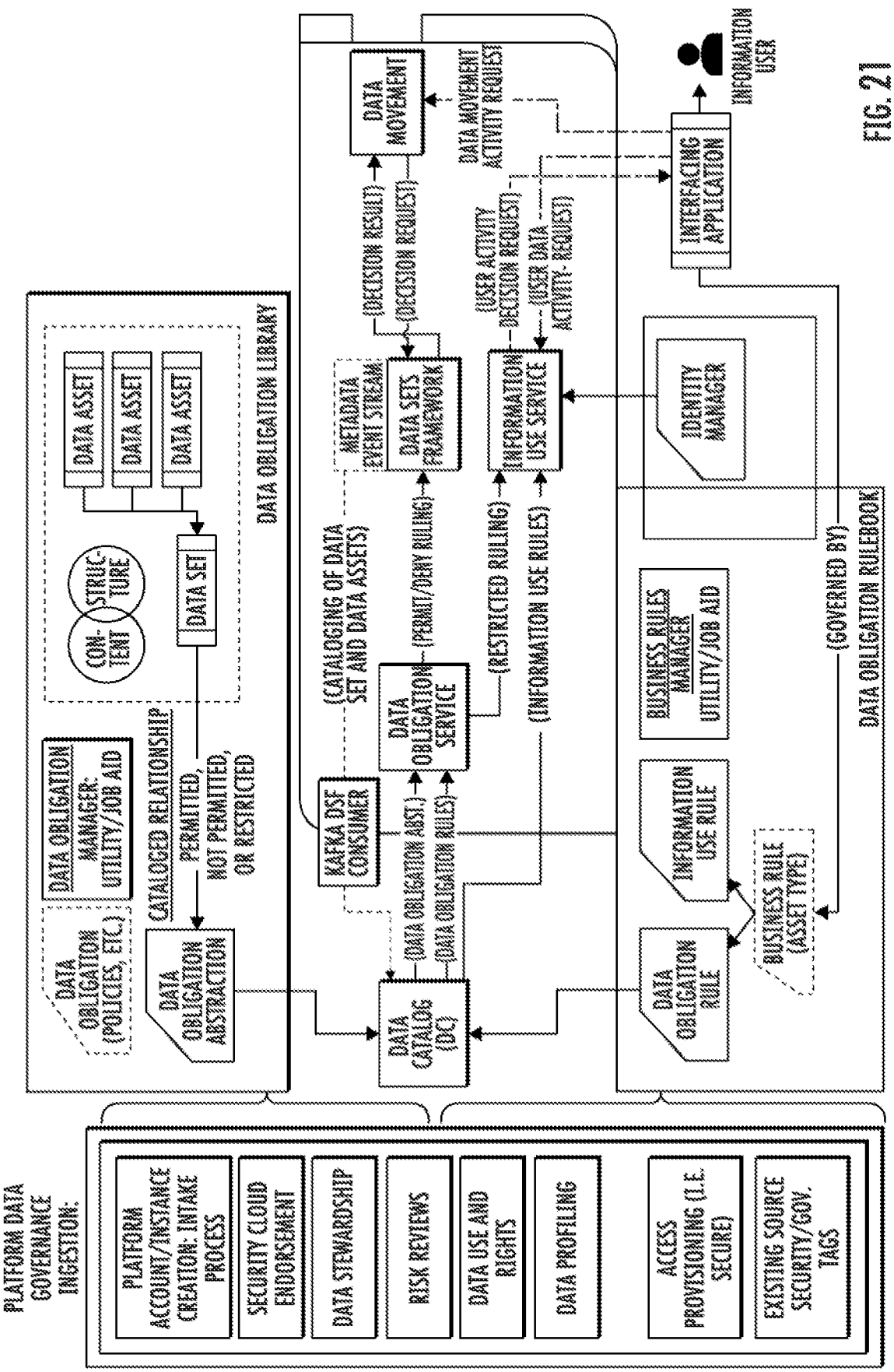
Figure 22:
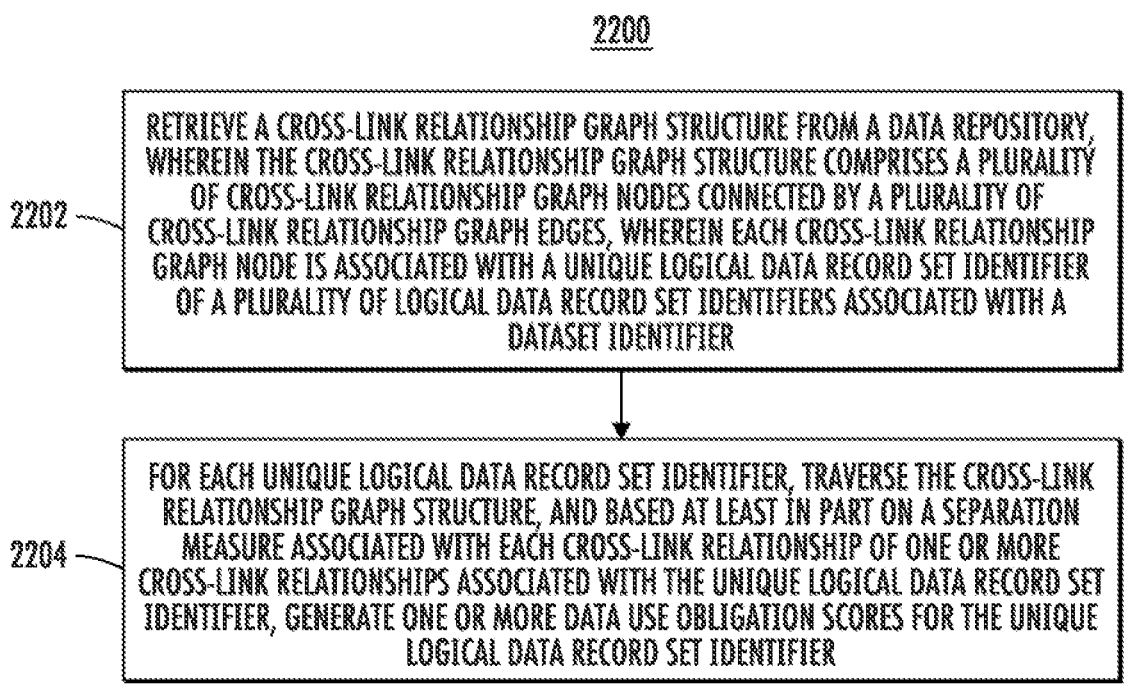
Figure 23:
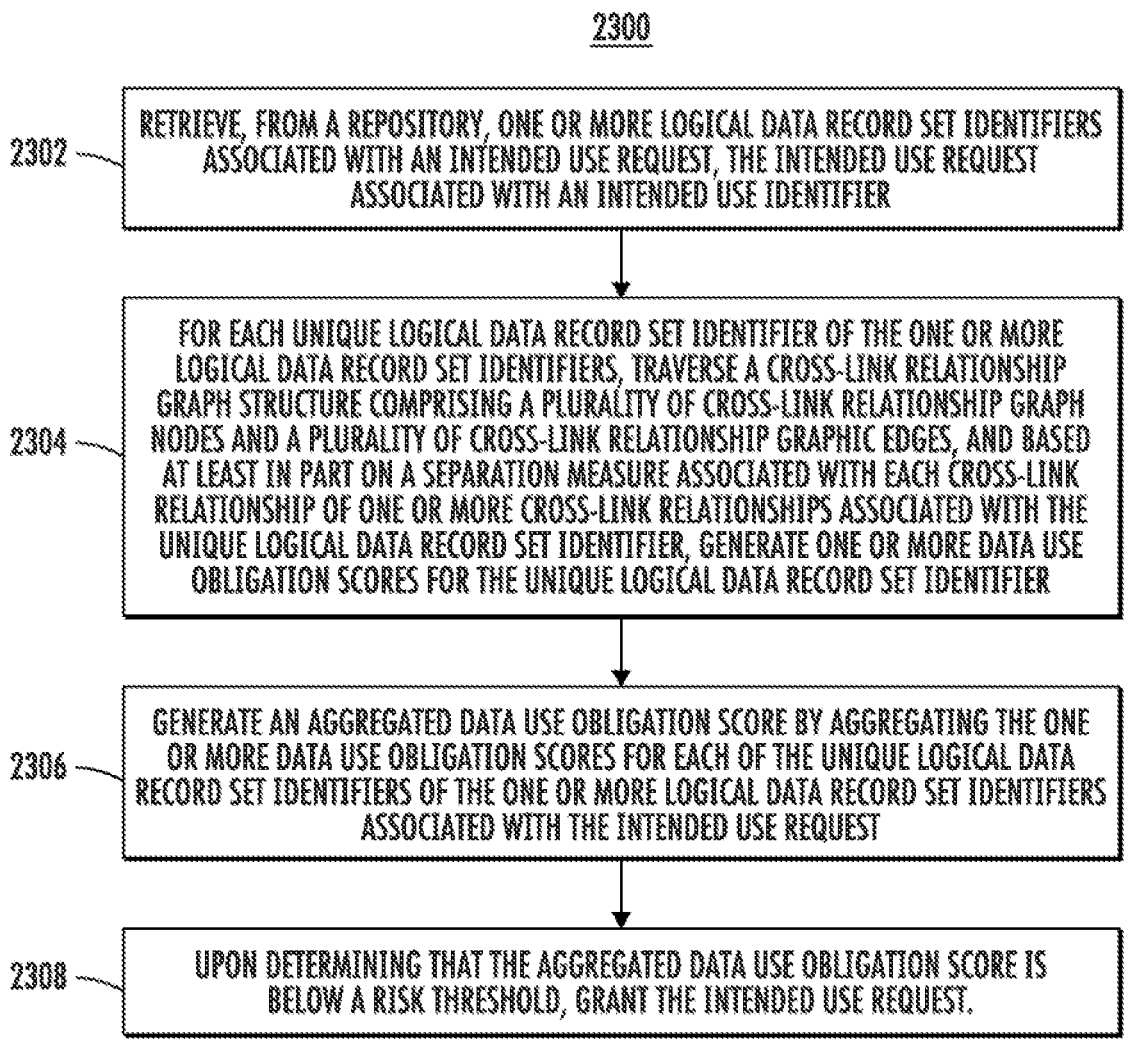
Figure 24:
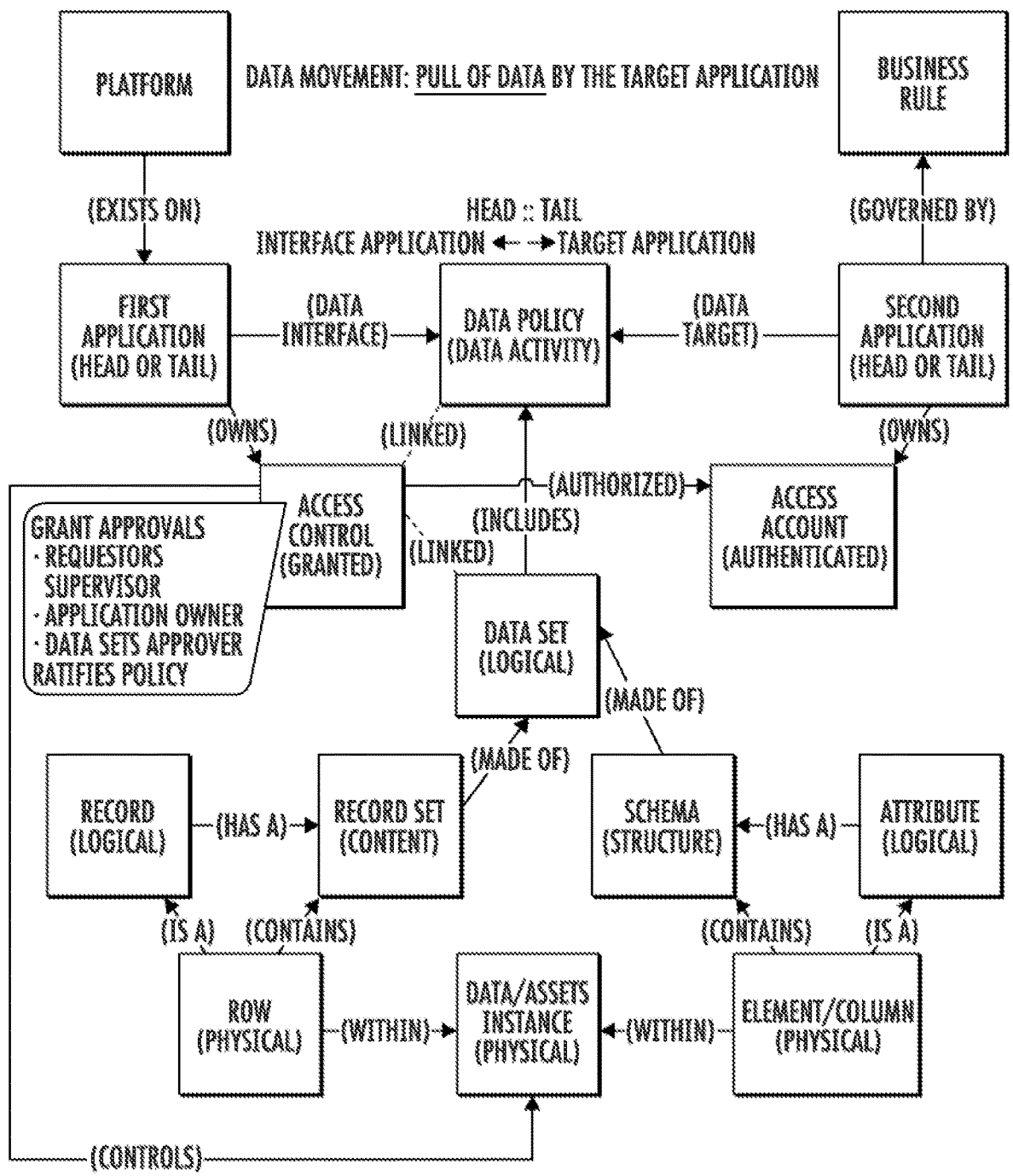
Figure 25:
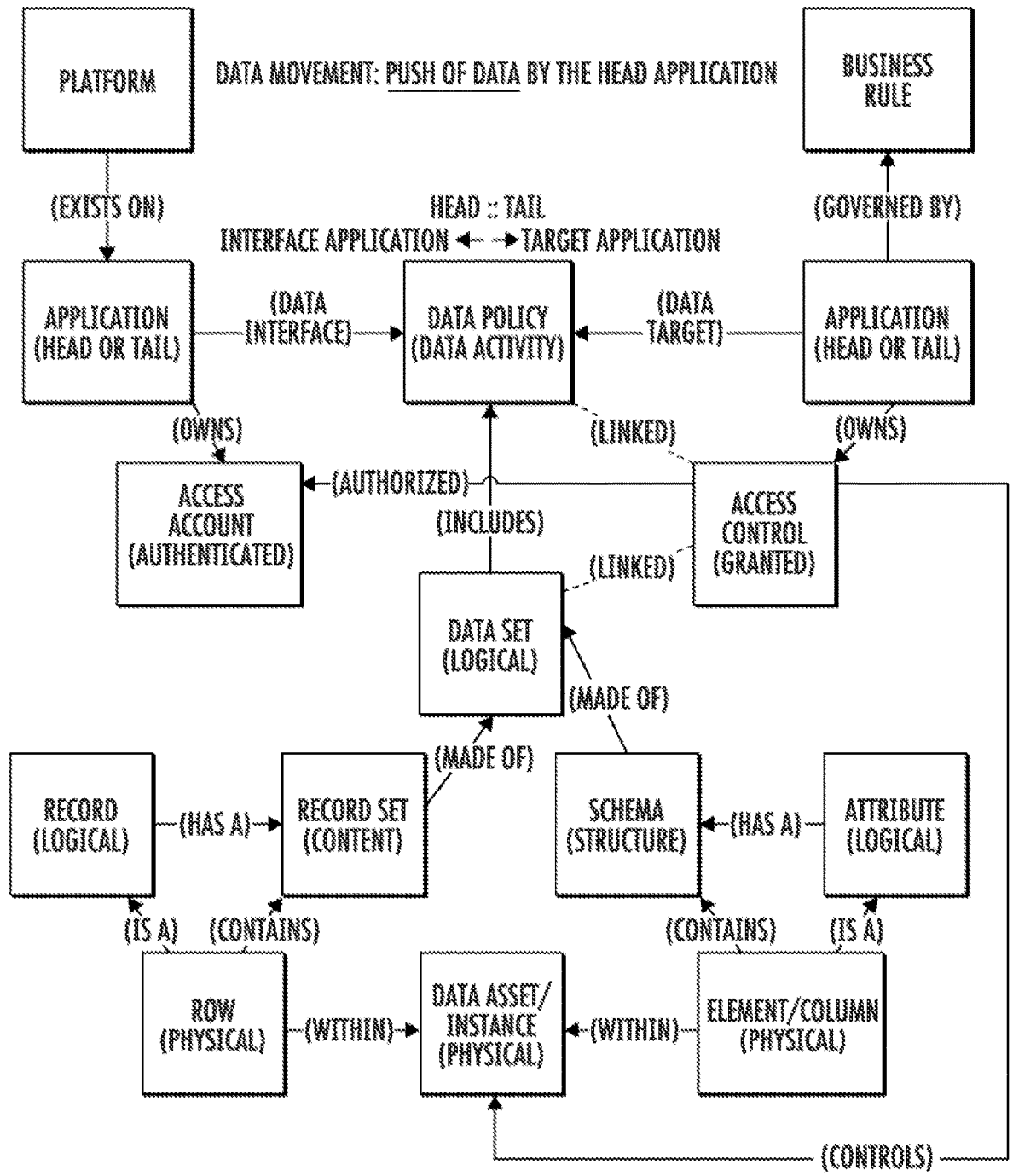

Having thus described certain example embodiments of the present disclosure in general terms, reference will now be made to the accompanying drawings, which are not necessarily drawn to scale, and wherein:

FIG. 1 illustrates an example computing system within which embodiments of the present disclosure may operate;

FIG. 2 illustrates a block diagram of circuitry used in association with a data rights tracking system, in accordance with some example embodiments;

FIG. 3 illustrates an example architecture for use in managing secured data according to embodiments of the present disclosure;

FIG. 4 illustrates an example interface configured to receive a user input including a dataset indication, in accordance with some example embodiments;

FIG. 5 illustrates an example interface illustrating an example volume, in accordance with some example embodiments;

FIG. 6 illustrates an example interface configured to receive asset registration information used for attaching an asset to a volume, in accordance with some example embodiments;

FIG. 7 illustrates an example interface configured to receive a user input including dataset permissions of use information, in accordance with some example embodiments;

FIG. 8 illustrates an example search interface configured to provide search capabilities of dataset and volume permissions of use information to a computing device, in accordance with some example embodiments;

FIG. 9 illustrates an example persona details interface configured to provide persona information input elements for updating a persona data object and/or generating a new persona data object, in accordance with some example embodiments;

FIG. 10 illustrates an example access control descriptive interface configured to provide data access information, in accordance with some example embodiments;

FIG. 11 illustrates an example logical data record, for use with embodiments of the present disclosure;

FIG. 12 illustrates an example logical data record, for use with embodiments of the present disclosure;

FIG. 13 illustrates an example logical data record, for use with embodiments of the present disclosure;

FIG. 14 illustrates an example row differentiator filtering, according to various embodiments of the present disclosure;

FIG. 15 illustrates an example field level differentiator filtering, according to various embodiments of the present disclosure;

FIG. 16 illustrates an example coarse record filtering, according to various embodiments of the present disclosure;

FIG. 17 illustrates an example coarse field level filtering, according to various embodiments of the present disclosure;

FIG. 18 illustrates an example graph structure for use with embodiments of the present disclosure;

FIG. 19 illustrates an example graph structure according to embodiments of the present disclosure;

FIG. 20 illustrates example components to controlled data usage, according to embodiments of the present disclosure;

FIG. 21 illustrates example operations associated with embodiments of the present disclosure;

FIG. 22 illustrates example operations associated with embodiments of the present disclosure;

FIG. 23 illustrates example operations associated with embodiments of the present disclosure;

FIG. 24 illustrates example data flow associated with embodiments of the present disclosure; and FIG. 25 illustrates example data flow associated with embodiments of the present disclosure.

DETAILED DESCRIPTION

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Numerous and diverse populations and sets of data records are created over time (e.g., temporally) to support all required aspects of a given field (e.g., healthcare). Each aspect is based on relationships to corresponding record set anchor points or record set nodes. Data use obligations are attained from gathering points in which the relationships between record set anchor point nodes are established. These required data use obligations can become disassociated as data records are transported and transformed into new sets of data. Furthermore, adjustments can occur over time to data use obligations, business lines, products, services or other key identifiers within the data critical to its operation. Due to these factors, often highly skilled direct human oversight is required to examine and correlate obligations to records of data to ensure the appropriate usage and protections are applied. In some cases, correlation is not possible, leaving datasets effectively denied to any access.

Embodiments herein solve the aforementioned problems and more by providing a probabilistic linkage across sets of records. With this probabilistic linkage, which is temporal based, appropriate obligations are applied to data sets based on a matching score. This application of a matching or data use obligation score, also referred to herein as a prediction, allows human or systematic operators to accept or refuse associated risk. To be clear, controlling access to data based upon permissions is preferably supplemented by filters associated with data use obligations that are properly linked to data records.

By way of example, a given user may wish to perform outreach to individuals that their given record has a high confidence score to be considered part of the member population (e.g., records set) a given segment is accountable for. For example, outreach to individuals within a member population that have residences within a geographic area impacted by a natural disasters to inform of potential benefits available to them.

By way of further example, a given user may wish to to withhold records that the given user has designated an obligation of "not permitted to move to a cloud platform" that have a high confidence score to be considered part of the member population (e.g., records set) a given segment is accountable for. For example, contractual restrictions are in place preventing the persistence of data within a cloud platform. Another example is in order to continue the business relationship for a given customer, although a contract may not dictate a restriction or obligation, a given user may wish to uphold the given customer's preference to have processing of records within the designated member population (e.g., records set) to not have data persisted in the cloud.

By way of further example, a data scientist may wish to obtain a record set (e.g., content) and attributes (e.g., structure) that has no known obligations for the intended usage of a data analytic the data scientist wishes to perform no matter the data obligation uses or confidence score. In other words, if there is any risk an obligation applies to a given record or attribute then the data scientist may wish to have that data filtered. For example, obligations can exist for a given record that prohibits de-identification itself, data aggregation, persistence within a non-production environment or the use of that records for a given research analytic.

Embodiments herein further enable technological improvements by way of enabling monitoring of information risk of data being accessed over time and by whom, as well as logging of such information risk associated with requests for access and usage of data. That is, by providing a mechanism by which a data use obligation score generated for a given data usage request can be logged (e.g., associated with one or more data records and/or user identifiers and/or data use patterns in a repository), a pattern (e.g., a count exceeding a threshold over a given network time period) of data use obligation scores exceeding a pattern score threshold (e.g., the pattern score threshold may or may not be the same as a risk threshold), problematic data records, user identifiers, data usage requests, and/or data patterns may be identified, flagged, investigated, and/or addressed. Addressing such problematic scores or requests may include triggering an automatic action such as increasing restrictions or obligations associated with one or more data records and/or one or more data usages, and/or adjusting permissions associated with one or more user identifiers found to be problematic (e.g., such a person may be considered high risk based on their cumulative data access requests over time). It will be appreciated that a pattern score threshold may be adjusted and/or dynamic, as can a count of data obligation scores exceeding a pattern score threshold that triggers action based on identified problems or risks. In some embodiments, a pattern score threshold of zero may exist for highly sensitive scenarios (e.g., public sector data). In embodiments, such logging and monitoring may be enabled by way of storing each data use obligation score generated for a given data record as metadata associated with the data record (e.g., the node).

Terminology

As used herein, the terms "data," "content," "information," and similar terms may be used interchangeably to refer to electronic data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "programmatically expected" indicates machine prediction of occurrence of certain events. The term "likelihood" refers to a measure of probability for occurrence of a particular event. The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like.

The term "user identifier" refers to one or more items of data by which a user may be identified. For example, a user identifier may comprise ASCII text, a pointer, a memory address, and the like.

The terms "user profile," "user account," and "user account details" refer to information associated with a user, including, for example, a user identifier, an email address, a real name (e.g., John Doe), a username (e.g., jdoe), a password, a real name, a time zone, a status, a position or role, an organizational or enterprise segment to which the user belongs, and the like. The user account details can include a subset designation of user credentials, such as, for example, login information for the user including the user's username and password.

The terms "dataset" and "data set" refer to a collection of data. A dataset can correspond to the contents of a single database table, or a single statistical data matrix, where every column of the table represents a particular variable, and each row corresponds to a given member of the data set in question. The data set can be comprised of tuples. A dataset is attached to an asset if the asset stores, processes, or transmits data in the dataset.

The term "volume" refers to a collection of one or more datasets and each dataset may belong to one or more volumes. Each volume may be attached to one or more assets and each asset may be attached to one or more volumes. A volume is attached to an asset if the asset stores, processes, or transmits data in the volume. Data attributes may be associated with a particular dataset or a particular volume. The term "data attributes" refers to one or more items of data representative of one or more classifications associated with secured data in an asset repository. Data attributes may be generated by a metadata source based on various sources of truth for attribute classifications. The sources of truth for attribute classifications may include: information provided by an information owner (transmitted via information owner device), legal restrictions, compliance restrictions, and/or the like. The data attributes may be generated using a machine learning model. In embodiments, written procedures and guidelines for data classification define what categories and criteria an organization or enterprise uses to classify data and specify the roles and responsibilities of employees or other entities within the organization or enterprise regarding data stewardship.

The term "data attribute identifier" refers to one or more items of data by which a data attribute may be uniquely identified. For example, a data attribute identifier may comprise ASCII text, a pointer, a memory address, and the like.

The term "access controls" refers to instructions that define a restriction on access to a dataset or a volume. For example, each data set or volume may be defined as only accessible to certain users. Examples of access controls include dataset permissions of use information and volume permissions of use information.

The term "secured data" refers to data that are secured and configured to be accessible to only a defined group of users, such as users granted with permissions of use to the secured data.

The term "dataset identifier" refers to one or more items of data by which a dataset may be uniquely identified. For example, a dataset identifier can comprise a data element representative of a dataset. A dataset identifier may include one or more data elements associated with the dataset, such as a name, an identifier, or the like associated with the dataset. For example, a dataset identifier may comprise ASCII text, a pointer, a memory address, and the like.

The term "permissions of use information" refers to data defining one or more conditions under which one or more users are granted access to a dataset or a volume, for example, having a user identifier equal to a pre-defined user identifier, or the like. A particular dataset or volume may be only accessible by the users granted access based on the permissions of use associated with the permissions of use information.

The term "dataset permissions of use information" refers to permissions of use information associated with a dataset. For example, dataset permissions of use information refers to data defining one or more conditions under which one or more users are granted access to a dataset. In embodiments, dataset permissions of use information is associated with a dataset permissions of use information identifier. A dataset permissions of use information identifier refers to one or more items of data by which dataset permissions of use information may be identified. For example, a dataset permissions of use information identifier may comprise ASCII text, a pointer, a memory address, and the like.

The term "volume permissions of use information" refers to permissions of use information associated with a volume. For example, volume permissions of use information refers to data defining one or more conditions under which one or more users are granted access to a volume. In embodiments, volume permissions of use information is associated with a volume permissions of use information identifier. A volume permissions of use information identifier refers to one or more items of data by which volume permissions of use information may be identified. For example, a volume permissions of use information identifier may comprise ASCII text, a pointer, a memory address, and the like.

The terms "register" or "registering" refer to the process of associating certain data or elements with other data. For example, dataset permissions of use information may be associated with or registered to a dataset.

The term "user identity" refers to one or more items of data associated with a user profile. The one or more items of data comprising a user identity may include: one or more identifiers associated with the user, one or more dataset identifiers representative of datasets to which the user is allowed access, one or more proper use identifiers associated with the user, or one or more other data elements, such as various information stored in a user profile associated with the user.

The term "persona data object" refers to electronically managed data, associated with a user identity, that embodies access control to particular volumes and/or corresponding datasets for defined allowed uses. In this regard, a persona data object may be linked to various data objects for facilitating such access. A persona data object includes or is otherwise associated with a "persona identifier" that is a text string, numeral, alphanumeric string, or other identifier that uniquely identifies a particular persona data object. In some embodiments, a persona identifier is configured to be associated with a user identity and/or user profile with where the associated user is to be linked to the persona data object. In this regard, a user identity and/or user profile have data access rights controlled based on an associated persona data object.

The term "persona information" refers to one or more identifiers for controlled access information associated with or included in a persona data object. Examples include restrictions associated with the persona, associated permissions of use information, allowed use identifier(s), allowed account type identifier(s), accessible volume identifier(s) and/or accessible dataset identifier(s), or any combination thereof.

The term "proper use" refers to a set of usage rules that defines one or more allowed uses for a dataset. Examples of proper use may include one or more of: provision, acquisition, extraction, discovery, analytics, or the like. In examples, a proper use may be associated with a dataset identifier and one or more proper use identifiers.

The term "proper use identifier" refers to one or more items of data by which a proper use may be identified. For example, a proper use identifier may comprise ASCII text, a pointer, a memory address, and the like.

The term "compliance" refers to enforcement of permissions of use and restrictions associated with datasets, as well as satisfactory enforcement of permissions of use and restrictions associated with datasets. For example, an organization or enterprise may be considered "compliant" if the organization or enterprise enforces all permissions of use and restrictions associated with datasets. As another example, the process of enforcing permissions of use and restrictions associated with datasets may be referred to as "compliance." It will be appreciated that "compliance" may be measured on a scale—for example an organization or enterprise may be 100% compliant, the organization or enterprise may be 50% compliant, the organization or enterprise may be some percentage less than 100% compliant, and the like.

The term "business owner" refers to an entity responsible for providing or defining allowed usage rules and authorization to access one or more datasets held within an owned asset.

The term "business owner identifier" refers to one or more items of data by which a business owner may be identified. For example, a business owner identifier may comprise ASCII text, a pointer, a memory address, and the like.

The term "business owner device" refers to a computing device controlled by a business owner that may include, without limitation, smart phones, tablet computers, laptop computers, wearables, personal computers, enterprise computers, and the like.

The term "information technology (IT) owner" refers to an entity responsible for authorizing data access requests based on proper use.

The term "IT owner identifier" refers to one or more items of data by which an IT owner may be identified. For example, an IT owner identifier may comprise ASCII text, a pointer, a memory address, and the like.

The term "IT owner device" refers to a computing device controlled by an IT owner that may include, without limitation, smart phones, tablet computers, laptop computers, wearables, personal computers, enterprise computers, and the like.

The term "information owner" refers to an entity responsible for managing attributes associated with datasets, such as by providing information that can be used to generate data attributes.

The term "information owner identifier" refers to one or more items of data by which an information owner may be identified. For example, an information owner identifier may comprise ASCII text, a pointer, a memory address, and the like.

The term "information owner device" refers to a computing device controlled by an information owner that may include, without limitation, smart phones, tablet computers, laptop computers, wearables, personal computers, enterprise computers, and the like.

The term "data steward" refers to an entity responsible for authorizing data access requests and providing information regarding data access controls. In an example context, such data access controls includes permissions of use information. In some embodiments, a data steward accesses functionality via data steward device.

The term "data steward identifier" refers to one or more items of data by which a data steward may be identified. For example, a data steward identifier may comprise ASCII text, a pointer, a memory address, and the like.

The term "data steward device" refers to a computing device controlled by a data steward that may include, without limitation, smart phones, tablet computers, laptop computers, wearables, personal computers, enterprise computers, and the like.

The term "end user" refers to an entity that consumes datasets, such as by attempting to access and utilize datasets. An end user is associated with a user identifier.

The term "end user device" refers to a computing device controlled by an end user that may include, without limitation, smart phones, tablet computers, laptop computers, wearables, personal computers, enterprise computers, and the like.

The term "data governance" refers to the management of the availability, usability, integrity and security of data used in an enterprise or organization. A sound data governance program includes a governing body or council, a defined set of procedures and a plan to execute those procedures.

The term "data stewardship" refers to the management and oversight of an organization's data assets to help provide business users with high-quality data that is easily accessible in a consistent manner.

The term "data attribute protection policy" refers to one or more permissions of use associated with a data attribute. A data attribute protection policy may be universal to any data having associated therewith the data attribute that is associated with the data attribute protection policy.

The term "data asset authority logic" refers to computing logic associated with an asset that is configured to identify one or more conflicts between restrictions and permissions of use associated with data contained therein.

As used herein, the terms "asset," "information asset," "information technology asset," "IT asset," and "technological asset" refer to a hardware or software technological asset configured for acquisition, storage, manipulation or processing, management, movement, control, display, switching, interchange, transmission, or reception of data or information. For example, an asset may be a hardware database, a software database embodied in various computing devices, or the like. In some example embodiments, an asset may be a storage device, repository, computer, computer equipment, network equipment and systems, and the like.

The term "volume identifier" refers to one or more items of data by which a volume may be uniquely identified. For example, a volume identifier may comprise ASCII text, a pointer, a memory address, and the like. In embodiments, a volume identifier may be a data structure having a plurality of fields, each field comprising or associated with a data steward identifier, an IT owner identifier, a business owner identifier, and/or an information owner identifier associated with each of the volume.

The term "volume metadata" refers to one or more items of data associated with a volume identifier, the one or more items of data representative of, for example, dataset identifiers associated with the volume (i.e., datasets belonging to the volume).

The term "asset registration data structure" refers to one or more items of data contained within a data structure, the data structure for use in registering one or more datasets or volumes with an asset. The one or more items of data may comprise one or more volume identifiers, one or more dataset identifiers, one or more asset identifiers, one or more business owner identifiers associated with the one or more asset identifiers, one or more IT owner identifiers associated with the one or more asset identifiers, and the like. The asset registration data structure may be used to attach a dataset and/or volume to an asset or associated a dataset and/or volume with an asset. The asset registration data structure may further comprise a description of the asset(s) identified by the one or more asset identifiers, for example one or more classifications of one or more datasets stored or otherwise proceed by the asset.

The term "asset metadata" refers to one or more items of data associated with an asset identifier. For example, asset metadata may comprise one or more of the elements of the asset registration data structure described above. For example, asset metadata may comprise one or more dataset identifiers associated with the asset identifier. The asset metadata may comprise one or more volume identifiers associated with the asset identifier. The asset metadata may further comprise one or more additional asset identifiers representative of assets associated or somehow related to the asset identified by the asset identifier.

The term "allowed account types" refers to organizational or enterprise electronic account types that are allowed to access a dataset or a volume. For example, a request to access a dataset or a volume originating from an account having a particular type may or may not be granted depending on whether the particular account type matches an allowed account type. Example account types include a service account, an end user account, a system account, and the like.

The term "allowed account type identifier" refers to one or more items of data by which an allowed account type may be identified. For example, an allowed account type identifier may comprise ASCII text, a pointer, a memory address, and the like.

The term "allowed use justifications" refers to use justifications allowed for a dataset or volume. Examples of use justifications may include treatment, payment, operations and regulatory.

The term "allowed use justification identifier" refers to one or more items of data by which an allowed use justification may be uniquely identified. For example, an allowed use justification identifier may comprise ASCII text, a pointer, a memory address, and the like.

The term "use identifier" refers to one or more items of data by which a use may be identified. For example, a use identifier may comprise ASCII text, a pointer, a memory address, and the like.

The term "offshore usage instruction" refers to an electronic instruction associated with a dataset identifier and/or a volume identifier, the instruction representative of whether the dataset associated with the dataset identifier and/or the volume associated with the volume identifier may be accessed by a computing device associated with an Internet protocol (IP) address that is known to have originated from a geographic location outside a defined boundary of GPS coordinates. For example, a dataset and/or volume may reside or have been created on computing systems and/or repositories located within a particular country (e.g., the United States). An offshore usage instruction may indicate that a computing device having an IP address that originated from or is associated with a location outside of the United States may or may not access the dataset and/or volume associated with the offshore usage instruction The term "allowed environments" refers to those environments within which computing devices may be operating that are approved for the computing devices to be granted access to a particular dataset or volume. Allowed environments may have associated therewith one or more dataset identifiers and/or one or more volume identifiers. Examples of environments include a production environment and a non-production environment.

The term "environment identifier" refers to one or more items of data by which a computing environment may be uniquely identified. For example, an environment identifier may comprise ASCII text, a pointer, a memory address, and the like. An approved environment may be associated with an environment identifier.

The term "personal protection flag" refers to an indicator associated with a dataset identifier and/or a volume identifier. The indicator represents whether the dataset associated with the dataset identifier and/or the volume associated with the volume identifier includes Personal Identifiable Information or Protected Health Information under the definition of Health Insurance Portability and Accountability Act (HIPAA). The term "proprietary information flag" or "confidential information flag" refers to an indicator associated with a dataset identifier and/or a volume identifier. The indicator represents whether the dataset associated with the dataset identifier and/or the volume associated with the volume identifier includes confidential and/or proprietary information that is viewed as property of the holder and not made available, or otherwise accessible, to other users associated with the general public at any time.

The term "data protection system" refers to a computing system configured to enforce controlled access to secured data and track such access of secured data according to embodiments described herein.

The terms "logical data record set" or "logical data record" refers to one or more logical data records that exist within a given dataset. That is, a given dataset may comprise a plurality of row identifiers, a plurality of row identifiers, and a plurality of values each associated with a unique combination of a row identifier and a column identifier. A given row identifier of the dataset may be associated with a data use obligation identifier based, in some embodiments, at least in part on one or more data attributes associated with data contained in the row associated with the given row identifier. Linking the given row identifier with the data use obligation identifier creates a logical data record for use in enforcing usage rules or other data use rules. In embodiments, a data use obligation identifier is distinct from a row identifier. In embodiments, a data use obligation identifier may be determined based at least in part on one or more dataset differentiators, one or more row differentiators, or one or more column differentiators.

A data set may be a logical description (e.g., an arrangement of the data set according to a particular data structure, according to a logical description) of a body of electronic data. A data set (or dataset) may exist independently from a data asset but can be used to describe a data asset. A data set may include two dimensions: a row dimension and a column dimension.

An example row dimension may have units referred to as rows, and may be associated with a population that the data of the dataset is associated with. All the rows, collected according to a specific definition, is the population. A subset of the population, based upon a known grouping definition, is often called a sample or subpopulation. An example of a population might be "current members of group A." A sample of the population "current members of group A" may be "current members of group A living in Texas." A row of the population might be "John Doe, member of group A, living in Houston, Tex."

An example column dimension may have units referred to as columns, and may be associated with a meaning of the data of the dataset is associated with. A set of related columns may be referred to as a schema. All columns of a related to a broad concept may be referred to as a domain. For example, a domain may be "member." Of the domain "member," several schemas (e.g., sets of columns that are logically related) may exist, such as "name" and "address." The schema "name" may contain several columns, including "first name" and "last name."

In view of the foregoing examples, a dataset may contain information (e.g., metadata) about both the population (e.g., rows) and meaning (e.g., columns) of a body of data. The row dimension and the column dimension are logically independent from one another. Since dimensions are independent, the dataset preferably contains both dimensions in order to describe a body of data. that is, neither dimension alone represents a dataset.

The terms "graph structure," "work graph structure," "cross-link relationship work graph structure," or "cross-link relationship graph structure" refer to a data structure configured to represent cross-link relationships between one or more logical data record sets. For example, a cross-link relationship graph structure may comprise or represent logical data records and cross-link relationships between the logical data records that represent data use obligations that apply to one or more records of the logical data records. In some embodiments, logical data records are represented by nodes of the cross-link relationship graph structure. In some embodiments, cross-link relationships and/or data use obligations are represented by edges of the cross-link relationship graph structure. The cross-link relationship graph structure can comprise one or more weighted graphs, multigraphs, isomorphic graphs, trees, the like, or combinations thereof.

The terms "cross-link relationship graph node," "graph node," or "node" refer to a node or a vertex of a graph structure or cross-link relationship graph structure. The cross-link relationship graph node may be representative of a logical data record or logical data record set associated with the cross-link relationship graph structure. Accordingly, the cross-link relationship graph node may represent a logical data record or logical data record set in relation to cross-link relationships or data use obligations further represented by edges, links, or lines within the cross-link relationship graph structure. A cross-link relationship graph node may be associated with various node metadata.

The terms "cross-link relationship graph edge," "graph edge," or "edge" refer to a representation of a relationship between a first logical data record or logical data record set, represented by a first cross-link relationship graph node, and a second logical data record or logical data record set, represented by a second cross-link relationship graph node, depicted or otherwise represented within a cross-link relationship graph structure. In some embodiments, the cross-link relationship graph edge may be represented by one or more lines, links, arrows, the like, or combinations thereof. The relationship represented by the edge may be indicative of a cross-link relationship between the two nodes, or data use obligations existing between the two nodes.

The terms "node metadata," "logical data record metadata," or the like may be used to refer to items of data associated with a node or a logical data record, such as, for example properties (e.g., row differentiators, column differentiators, dataset differentiators, and the like) associated with a logical data record. Additional properties or metadata associated with a node may include, in various embodiments, a node identifier that may comprise one or more items of data by which the unique instance of the node may be uniquely identified.

The terms "edge metadata," "cross-link relationship edge metadata," "relationship metadata" or the like may be used to refer to items of data (e.g., properties) associated with an edge or a cross-link relationship represented by an edge. For example, edge metadata may include a relationship type. Additional properties or metadata associated with an edge may include, in various embodiments, an edge identifier that may comprise one or more items of data by which the unique edge may be uniquely identified. Further additional edge metadata may include an effective date associated with the relationship represented by the edge. The effective date of the relationship may be represented by a network timestamp comprising a date and time. The effective date of the relationship may represent a date and time at which the relationship became effective (e.g., a contract start date). An edge may also be associated with an edge creation date associated with when the edge was created within the computing entity or repository associated with the graph data structure the edge is part of. In embodiments, the relationship effective date is different from the edge creation date. For example, an edge creation date may be associated with a date a contract was signed and then entered or generated as an edge, while a relationship effective date may be associated with a date the contract becomes effective.

Further additional edge metadata may include a relationship source identifier, representing a source from which the relationship originated (e.g., a contract). The relationship source identifier may comprise one or more items of data by which a relationship source may be uniquely identified. Examples of relationship source identifiers include a contract identifier associated with a relationship generated between a product node and a customer node. The relationship source identifier enables retrieval of obligations from the generator of the relationship (e.g., contract based data usage rules, obligations, restrictions).

The term "cross-link relationship" refers to a logical linkage or representation of a relationship between two or more logical data records. For example, a data scientist may conduct analysis on a dataset of phone calls. The phone calls are from providers (e.g., a first logical data record, represented by a first node), calling on behalf of individuals (e.g., a second logical data record, represented by a second node), for advice on their clinical conditions (e.g., relationship, represented by a first edge). The dataset includes variables such as providers, individuals, and dates of calls. The dates of calls may be designated as effective dates (e.g., metadata) for the relationships (e.g., first edge) between the first node and the second node.

The term "data use obligation score" refers to a likelihood that one or more data use obligations apply to a given logical data record or logical data record set. In embodiments, a data use obligation score is generated based at least in part on separation measures associated with cross-link relationships between a given logical data record and other logical data records of a dataset or multiple datasets, time associated with the cross-link relationships (e.g., when the cross-link relationship was established, how long the cross-link relationship has been established, and the like), as well as a strength measure associated with identifiers of the logical data record or logical data record set. For example, an identifier represented by a person's name or by a person's social security number may be considered stronger than an identifier represented by a phone number.

In embodiments, a differentiator, or collection of differentiators, may be able to represent a record or record set by its statistical uniqueness. Such ability may be a strength measure impacting the calculated score of a data use obligation. Statistical uniqueness is also influenced by the size of the population or sample evaluated. A differentiator used to identify records or record sets within smaller populations will tend to have a higher strength measure than the same differentiator within larger populations.

By way of example, a combination of Customer (e.g., Company) Name, Benefit Plan/Group Number and other unique identifier may be required to uniquely represent a given data use obligation created by a contract. A Group Number can potentially be reused across multiple lines of business. Hence in a larger population, that spans across many businesses, a Group Number is not considered to be enough to provide a high strength measure. Using both Group Number and Customer Name increases the overall strength as the combination increase the statistical uniqueness. If all three required differentiators are available within the dataset and used, the data use obligation score can possibly be a max of 100 for full confidence that a related data use obligation applies.

By way of further example, a differentiator, or collection of differentiators, may be able to identify a unique individual member. A combination of First and Last Name plus phone number can generate a significant confidence score. Phone number as a differentiator on its own may not carry the same strength. Social Security on its own is provides a high confidence score due to its statistical uniqueness. It is also possible to utilize partial information from a given differentiator in combination with other differentiators to generate a high confidence score. For example, utilizing partial name along with street address to generate a confidence score.

The term "separation measure" refers to a degree of separation, by way of cross-link relationship edges, between two logical data records or logical data record sets. In embodiments, each separation (e.g., edge) between two logical data records or nodes may reduce a probability or likelihood that data use obligations are shared among the two logical data records. For example, a first node that is separated from a second node by a single edge may have a data use obligation score (e.g., based on a possible or actual cross-link relationship) that is higher than a third node that may be separate from a fourth node by two or more edges.

The term "risk threshold" refers to an acceptable level of likelihood that data use obligations will apply to a given logical data record or logical data record set for a particular application or intended use. For example, a risk threshold may represent how much of a risk a business is willing to take with respect to enabling access to or use of data that may have data use obligations associated therewith. In embodiments, a risk threshold is based at least in part on an intended use of the data (e.g., use of data for internal analytics or operations has a different risk threshold than external transfer of data to third parties). In embodiments, a risk threshold is based at least in part on the data obligations that may apply to the data (e.g., a transaction ID associated with an individual does not have the same exposure risk as compared to an individual's social security number or genomic data). In embodiments, a risk threshold is based at least in part on dependencies between row differentiators and column differentiators of a given logical data record or logical data record set. Examples of such dependencies include, without limitation:

De-identified dataset with N (row count)<100 can change PHI column differentiators from low risk to high risk (e.g., sample size too small and individuals become identifiable);

Certain combinations of columns can together change Proprietary Business Information column differentiators from low risk to high risk (e.g., if the variables and the calculated result from a model were within the same dataset, then together the set of fields would be considered proprietary since the formula could be derived from the data);

A member can indicate restrictions on use of their data (e.g., research) under a specific contract, but not another (e.g., this can be an artifact of a member potentially being under multiple policy plans);

Under some conditions, certain diagnosis codes may change a sensitive conditions column differentiator from low risk to high risk;

Certain conditions, such as pregnancy, can be considered sensitive depending on the state within which the individual resides and receives the service.

The terms "data application" or "intended use" refer to how a consumer of data intends to use the data. That is, while a given consumer of data may have distinct permissions associated with a dataset, a logical data record set, or even a single item of data, and those permissions provide the consumer of the data with a certain level of access to the data, there may be risks, restrictions, or obligations associated with the data or logical data record set that contribute to a determination not to allow a particular application or use of the data. Examples of applications or intended uses include, without limitations, offshore operations, research, analysis, standardization, and more.

The term "intended use threshold" refers to an acceptable level of data obligation score calculated for a given intended use, based in embodiments on rules associated with intended use rules or applications. That is, while an aggregated data use obligation score may be acceptable according to a risk threshold for a single request, a pattern of elevated or other level of data obligation scores being calculated for a data set or record or intended use or by a given user identifier may be considered unacceptable. An intended use threshold is employed in embodiments to enable flagging of such activity.

The term "alert flag" refers to an electronic indicator (e.g., a bit, an item of data, or the like) that may be associated in a repository with one or more of a data set, a data record, an intended use request, an intended use, a data use pattern, or a user identifier, when one or more data use obligation scores generated as associated with any of the foregoing illustrate a pattern of risk (e.g., consistently exceeding an intended use threshold; a single instance of exceeding an intended use threshold; and the like).

The terms "score calculation count threshold" or "count threshold" refer to a number of times a given data set or record or intended use or by a given user identifier may be associated with scores exceeding one or more of a risk threshold or an intended use threshold.

The term "allowed use" refers to types of uses allowed for a dataset or volume. Example types of allowed use include analytics, enrichments, consumption, provision, or the like. An allowed use may be associated with a use identifier, such that the use identifier represents a use of data within the dataset or volume that is allowed.

The terms "restrictions," "obligations," or "data use obligations" refer to instructions that define control of access to or use of a dataset set forth in a contract, defined policy, or law associated with the dataset. Examples of restrictions, obligations, or data use obligations include contractual restrictions, customer committed restrictions, legal restrictions, and more.

The terms "contractual restrictions" or "contractual obligations" refer to instructions that define control of access to or use of one or more datasets based on a contract associated with the one or more datasets. For example, certain privacy of use contracts may include terms defining how certain private data need to protected.

The terms "customer committed restrictions" or "customer committed obligations" refer to instructions that define control of access to or use of one or more datasets representing commitments made to a customer associated with the one or more datasets. For example, certain commitments may include terms defining how data is to be used which may not reflect the detail as agreed in the contract.

The terms "legal restrictions" or "legal obligations" refer to instructions that define control of access to or use of one or more datasets based on a law associated with the one or more datasets. For example, laws such as Health Insurance Portability and Accountability Act may define restrictions related to datasets associated with identities of patients.

The term "usage rules" refers to instructions that define control of access to or use of one or more datasets based on the intended use of the dataset. Example types of use include analytics, enrichments, consumption, provision, or the like. One or more types of use may be disallowed under the usage rules and one or more types of use may be allowed under the usage rules. The usage rules may also be associated with one or more user identifiers that are allowed to access the one or more datasets and one or more user identifiers that are not allowed to access the one or more datasets.

The term "data use obligation identifier" refers to one or more items of data by which a data use obligation may be uniquely identified. For example, a data use obligation identifier may comprise ASCII text, a pointer, a memory address, and the like.

The term "logical data record set identifier" refers to one or more items of data by which a logical data record set may be uniquely identified. For example, a logical data record set identifier may comprise ASCII text, a pointer, a memory address, and the like.

The term "row differentiator" refers to one or more data use obligations associated with a row of data of a dataset and/or a logical data record. The term "column differentiator" refers to one or more data use obligations associated with a row of data of a dataset and/or a logical data record. Examples of row differentiators, according to various embodiments, include without limitation obligations based on member level obligations (e.g., state level regulations, data protection acts associated with geographic locations associated with the member), provider level obligations, contract related obligations (e.g., customer obligations, product obligations, research obligations, and the like). Examples of column differentiators, according to various embodiments, include without limitation safe harbor related obligations (e.g., name, social security number, and the like), field level classification obligations (e.g., sensitive conditions, personal information, protected information, confidential information, protected health information, and the like).

Example System Architecture

FIG. 1 illustrates an example computing system 100 within which embodiments of the present disclosure may operate. The example computing system 100 comprises a data repository 102, a data rights tracking system 104, and a data protection system 106. The data rights tracking system 104, data repository 102 and data protection system 106 may communicate with each other via underlying network 108.

The data repository 102 is a collection of data repositories that stores secured data to be governed by the data rights tracking system 104 and data protection system 106. The data repository 102 may be embodied as one or multiple computing devices. The data repository 102 may include asset data repository 102A and metadata repository 102B. Asset data repository 102A is one or more assets embodied as one or more databases that store secured data to be governed by the data rights tracking system 104 and data protection system 106.

Metadata repository 102B is configured to store a set of data attributes associated with the secured data in the asset data repository 102A. The data attributes are classifications associated with the secured data in the asset repository 102A. The metadata repository 102B may receive the set of data attributes from a metadata source configured to generate the data attributes based on various source of truth for attribute classifications. The source of truth for attribute classifications may include: information owner provided information (transmitted via information owner device 304), legal restrictions, compliance restrictions, and/or the like. The data attributes may be generated using a machine learning model. In some embodiments, the metadata repository 102B may be periodically updated or updated on demand.

The data rights tracking system 104 is a system configured to register data access controls to the secured data independent of the asset that stores, processes, and transmits the secured data. Example data access controls includes dataset permissions of use information and volume permissions of use information.

The data protection system 106 is a system configured to assign protection policies to one or more assets storing the secured data, such as one or more assets utilized to embody the asset data repository 102A, based on data access controls registered by the data rights tracking system 104. The data protection system 106 serves as an enforcement point for the data access controls registered by the data rights tracking system 104 by applying the data access controls registered by the data rights tracking system 104 (i.e., the data access controls are independent of the assets) to the assets. The data protection system 106 may be configured to grant access to data stored in asset data repository 102A by one or more end user devices based on data access controls stored in the data rights tracking system 104.

Secured data stored in the example computing system 100 is organized in various datasets. Each dataset includes various cataloging characteristics for data access controls registered by the data rights tracking system 104. Datasets are organized into volumes. A volume is a collection of one or more datasets and each dataset may belong to one or more volumes. Each volume may be attached to one or more assets and each asset may be attached to one or more volumes. A volume is attached to an asset if the asset stores, processes or transmits data in the volume. Data attributes may be associated with a particular dataset and/or a particular volume.

Example Apparatus for Implementing Embodiments of the Present Disclosure

The data rights tracking system 104 may be embodied by one or more computing devices, such as apparatus 200 shown in FIG. 2. As illustrated in FIG. 2, the apparatus 200 may include a processor 202, a memory 204, input/output circuitry 212, communications circuitry 210, and circuitry to implement various modules such as data identity registration module 206, permissions of use registration module 208, proper use module 216, and data asset authority logic module 214. The apparatus 200 may be configured to execute the operations described herein. Although these components 202-216 are described in part using functional limitations, it should be understood that any implementations necessarily include the use of particular hardware. It should also be understood that certain of these components 202-216 may include similar or common hardware. For example, multiple modules or circuitries may leverage use of the same processor, network interface, storage medium, or the like, to perform their associated functions, such that duplicate hardware is not required for each distinct module or circuitry. The terms "circuitry" and "module" as used herein therefore includes particular hardware configured to perform the respective functions described herein.

Of course, while the term "circuitry" or "module" should be understood broadly to include hardware, in some embodiments it may also include software for configuring the hardware. In some embodiments, "circuitry" or "module" may include processing circuitry, storage media, network interfaces, input/output devices, and the like. In some embodiments, other elements of the apparatus 200 may provide or supplement the functionality of particular circuitries or modules. For example, the processor 202 may provide processing functionality, the memory 204 may provide storage functionality, the communications circuitry 210 may provide network interface functionality, and the like.

The processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 212 that may, in turn, be in communication with processor 202 to provide output to a user and, in some embodiments, to receive an indication of user input. The input/output circuitry 212 may comprise a user interface and may include a display and may comprise a web user interface, a mobile application, a client device, or the like. In some embodiments, the input/output circuitry 212 may also include a keyboard, a mouse, a touch screen, touch areas, soft keys, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 210 may be any means such as a device or circuitry embodied in either hardware or a combination of hardware and software that is configured to receive and/or transmit data from/to a network and/or any other device, circuitry, or module in communication with the apparatus. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The data identity registration module 206, the permissions of use registration module 208, the proper use module 216, and the data asset authority logic module 214 may be any means such as a device or circuitry embodied in either hardware or a combination of hardware and software that is configured to perform the corresponding functions of these components that are described herein. It should be appreciated that, in some embodiments, the data identity registration module 206, the permissions of use registration module 208, the proper use module 216, and/or the data asset authority logic module 214 may include a separate processor, specially configured field programmable gate array (FPGA), or application specific interface circuit (ASIC) to perform the corresponding functions described herein. Accordingly, in one fashion or another, the data identity registration module 206, the permissions of use registration module 208, the proper use module 216, and the data asset authority logic module 214 are therefore implemented using hardware components of the apparatus which may in turn be configured by either hardware or software.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Management of Secured Data

FIG. 3 illustrates an example architecture for use in managing secured data according to embodiments of the present disclosure. Business owners provide allowed usage rules and authorization to utilize secured data held within an asset managed by the business owners via a business owner device 302. A unique business owner identifier may be associated with each of the business owners.

Information owners provide attribute classification information and/or attest attribute classification generated by a machine learning model via information owner device 304. A unique information owner identifier may be assigned to each of the information owners. As previously described, the attribute classification information provided via information owner device 304 may be utilized to generate data attributes stored in the metadata repository 102B. Information owners may also provide machine learning model and/or feed training data to the machine learning model configured to generate data attributes. The data attributes may be stored in the data rights tracking system 104.

Data stewards, designated by business owners in some examples, may provide information regarding data access controls such as permissions of use information via data steward device 306. A unique data steward identifier may be associated with each of the data stewards. The information regarding data access controls provided via data steward device 306 may be processed by the data rights tracking system 104. The data rights tracking system 104 may generate and store data access controls based on the information regarding data access controls provided via data steward device 306.

End users may consume data, such as attempting to access data, via end user device 308. A unique end user identifier may be assigned to each of the end users. The data protection system 106 may be configured to grant access to data stored in asset data repository 102A to one or more end user devices 308 based on data access controls stored in the data rights tracking system 104. In some embodiments, various data representative of user identity, such as one or more identifiers associated with the user, one or more dataset identifiers associated with those datasets the user is allowed to access, one or more proper use identifiers associated with the user identifier, and the like, may be checked to verify that the end user device 308 is controlled by and/or associated with a user identifier associated with an end user allowed to access the datasets. In some such embodiments, each user identifier may be associated with one or more role identifiers, where each role identifier is associated with one or more proper use identifiers. Additionally or alternatively, each user identifier may be associated with one or more persona identifiers.

Compliance managers provide assurance of enforcement of data protection system 106 via compliance device 310. A unique compliance manager identifier may be assigned to each of the compliance managers. Compliance device 310 may be configured to communicate with the data protection system 106.

Each of the business owner device 302, information owner device 304, data steward device 306, end user device 308, and compliance device 310 may be embodied as various computing devices such as a computer, a server, a mobile device, and/or the like.

Example Operations Performed By the Present System

FIG. 4 illustrates exemplary operations for registering access controls to secured data independent of the asset that stores, processes, and transmits the secured data, in accordance with some example embodiments. As noted previously, these operations may be performed by the data rights tracking system 104 with the assistance of, and/or under the control of a computing device such as apparatus 200.

Embodiments herein include means, such as communications circuitry 210, input/output circuitry 212, or the like, for receiving an dataset identifier. As previously described, secured data stored in the example computing system 100 is organized into various datasets. Datasets are organized into volumes. A volume is a collection of one or more datasets and each dataset may belong to one or more volumes. Each volume may be attached to one or more assets and each asset may be attached to one or more volumes. A volume is defined as attached to an asset if the asset stores, processes or transmits data in the volume. Data attributes may be associated with a particular dataset or a particular volume.

A dataset identifier may include one or more of 1) a unique identifier associated with the dataset, 2) a dataset publication status, 3) a data steward identifier associated with a data steward associated with the dataset, 4) a name associated with the dataset, 5) one or more volume identifiers associated with the dataset, and/or the like. In some embodiments, the dataset identifier may be received from a data steward device 306. Alternatively or additionally, the dataset identifier may be received from an information owner device 304.

An example interface 400 configured to receive a user input including a dataset identifier is illustrated in FIG. 4. As illustrated in FIG. 4, the interface 400 includes input fields configured to receive user inputs representing a dataset name, a dataset description, a dataset publish date, identifiers related to dataset ingestion roles such as business owner identifier and information owner identifier, identifiers related to dataset consumption roles such as IT (Information Technology) owner and data steward. In some embodiments, an IT owner is responsible for applying/enforcing a set of defined controls upholding usage rules and data access controls. The interface 1200 further includes input fields configured to receive one or more volume identifiers associated with the dataset including volume title, volume description, and volume attached assets.

Embodiments herein include means, such as data identity registration module 206 executed using processing circuitry, or the like, for organizing a dataset associated with the dataset identifier into one or more volumes. Each of the one or more volumes is associated with a unique volume identifier. In this regard, the apparatus 200 may receive data embodying updated values for various volume details, for example in response to user engagement data received in response to a save button or other user interface element configured to initiate submission of inputted data. Additionally or alternatively, the apparatus 200 may store such received volume details, for example in response to the user engagement data. Additionally or alternatively still, in some embodiments, the apparatus 200 may update the volume based on user engagement data received in response to user interaction by a user with the interface, for example to publish the volume and/or attached datasets.

FIG. 5 illustrates an example interface 500 configured to display various volume details, according to embodiments of the present disclosure. As illustrated in the example interface 500, the volume details include a volume name, a volume description, a volume publish date, a volume IT Owner identifier, a volume Data Steward identifier, a volume Business Owner identifier, a volume Information Owner identifier, one or more asset identifiers associated with the volume, asset name(s) and other related information, and dataset identifiers and associated metadata associated with one or more datasets that belong to the volume. The metadata associated with the one or more datasets include dataset publication dates, data steward identifiers associated with each of the one or more datasets, an accessible records count associated with each of the one or more datasets, a dataset restrictions count identifying the number of restrictions applied for each of the one or more datasets, protection classifications associated with each of the one or more datasets, and/or other metadata associated with the one or more datasets. The interface 500 may further be configured for enabling access to volume details submission and/or storing functionality, for example via the "save as draft" or a similar interface element configured to initiate such functionality, for example in response to user interaction upon changing aspects of the volume details. Additionally or alternatively, the interface 500 may further be configured for enabling volume publishing data, for example via the "publish" or a similar interface element configured to initiate such functionality, for example in response to user interaction indicating a desire to change the publication status of the volume and/or associated datasets. Additionally or alternatively, the interface 500 may further be configured for enabling dataset attachment functionality, for example via the "attach dataset" or a similar interface element configured to initiate such functionality, for example in response to user interaction with such element.

Embodiments herein include means, such as data identity registration module 206 executed by processing circuitry, or the like, for attaching one or more assets to the one or more volumes. In embodiments, one or more assets are attached to the one or more volumes by associating one or volume identifiers associated with the one or more volumes with one or more asset identifiers associated with the one or more assets.

FIG. 6 illustrates an exemplary interface 600 configured to receive asset registration information used for attaching an asset to a volume. In some embodiments, the apparatus 200 causes the interface 600 to be rendered in response to user interaction indicating and/or associated with a request to attach an asset to a volume. In this regard, for example, the user may interact with one or more interface elements of the interface 500 described above, such as an "attach dataset" interface element or another interface element configured to initiate such functionality.

Embodiments herein include means, such as communications circuitry 210, input/output circuitry 212, or the like, for receiving dataset permissions of use information associated with the dataset. In some embodiments, the dataset permissions of use information associated with the dataset is received from a data steward device 306 or an information owner device 304.

FIG. 7 illustrates an exemplary interface 700 configured to receive a user input including the dataset permissions of use information. As illustrated in FIG. 7, the interface 1500 includes input fields configured to receive user inputs providing various permissions of use details such as allowed account types, allowed environments, allowed use, allowed use justifications, offshore usage instructions (e.g., offshore allowed), personal protection flag (e.g., protection consumption profile), and one or more record authorization mechanisms.

Embodiments herein include means, such as permissions of use registration module 208 executed by processing circuitry, or the like, for registering dataset permissions of use information with the dataset. Dataset permissions of use information are registered with the dataset by associating a dataset permissions of use information identifier associated with the dataset permissions of use information with the dataset identifier.

Embodiments herein include means, such as permissions of use registration module 208 executed by processing circuitry, or the like, for registering volume permissions of use information with the one or more volumes. In some embodiments, volume permissions of use information are registered with the one or more volumes by associating a volume permissions of use information identifier associated with the volume permissions of use information with the one or more volume identifiers. In this regard, access to a volume (having a particular volume identifier) will be limited based on the volume permissions of use information (having a particular volume permissions of use information identifier) where the such identifiers are associated.

Embodiments herein include means, such as the data asset authority logic module 214, executed by processing circuitry, for receiving a set of restrictions associated with the dataset. The set of restrictions may be derived based on various obligations associated with controlled access to the dataset, such as contractual restrictions, legal restrictions, customer committed restrictions, or the like. The set of restrictions may be generated and transmitted from compliance device 310 or information owner device 304. Example restrictions include limitations and/or prevention on accessing data for offshoring, data aggregation, de-identification, and/or research, or any combination thereof.

Offshoring, as mentioned above, refers to access to a dataset that resides in a particular geographic location by computing devices associated with IP addresses originating from outside a particular geographic boundary. For example, offshoring may refer to the use, disclosure, storage, receipt, processing, transferring, handling or accessing of protected health information (PHI) in the dataset to or by a computing entity located outside the fifty United States and/or United States territories (American Samoa, Guam, Northern Marianas, Puerto Rico, and Virgin Islands). Examples of countries that might be considered "offshore" with respect to the United States include, without limitation, Mexico, India, the Philippines and Canada.

Data aggregation refers to combining one or more distinct data record(s), datasets, and/or subsets of one or more dataset(s), where the combined portions of data are associated with separate entities. In a particular example context, data aggregation refers to combining PHI in the dataset from two or more Health Insurance Portability and Accountability Act (HIPAA) covered entities for data analysis regarding their health care operations (such as for quality improvement or evaluation of performance).

De-identification refers to the identification and/or data alteration of one or more data categories within one or more data record(s) of one or more data set(s) such that such altered data categories do not identify particular entities associated with the data record. In one example context, de-identification refers to taking PHI in the dataset and converting it (by removing certain "identifiers") so that the health information (1) no longer identifies any particular individual; and (2) cannot reasonably be used to identify any particular individual.

Research refers to a systematic investigation, including research development, testing, and evaluation, designed to develop or contribute to generalizable knowledge that utilizes one or more data records of a dataset, and/or particular data categories within one or more data record(s). In one example context, research refers to a systematic investigation including research development, testing, and evaluation, designed to develop or contribute to generalizable knowledge that utilizes PHI in the dataset.

Embodiments herein include means, such as the data asset authority logic module 214, executed by processing circuitry, for identifying, by comparing the set of restrictions to dataset permissions of use information, that the set of restrictions does not conflict with the dataset permissions of use information previously registered. In this regard, rule sets for comparing one or more restrictions to the dataset permissions of use information may be embodied and/or stored as software, hardware, or a combination thereof. After the data asset authority logic module 214 identifies that the set of restrictions does not conflict with the dataset permissions of use information, the data asset authority logic module 214 may validate the set of restrictions and generate and store an indication of the validation. If the data asset authority logic module 214 identifies that the set of restrictions conflicts with the dataset permissions of use information previously registered, the data asset authority logic module 214 may generate and store an indication that the set of restrictions is not validated. In some embodiments, timestamp data associated with receiving the set of restrictions, validating or not validating the set of restrictions may be recorded and stored. It will be appreciated that, prior to comparing the set of restrictions to the dataset permissions of use information, the data asset authority logic module may retrieve the dataset permissions of use information associated with the dataset from a repository. It will be appreciated that the indication that a set of restrictions is valid is an item of data representative of a confirmation that the set of restrictions does not conflict with dataset permissions of use information for a particular dataset.

Embodiments herein include means, such as data identity registration module 206 of apparatus 200 executed by processing circuitry, for organizing the dataset into one or more volumes in accordance with example embodiments. The data identity registration module 206 receives a volume identifier associated with one or more volumes The volume identifier may be in the form of a volume identifier data structure having a plurality of fields, each field comprising or associated with one or more of a unique volume identifier, a data steward identifier, an IT owner identifier, a business owner identifier, and/or an information owner identifier associated with each of the volumes. The volume identifier data structure may include one or more unique identifiers associated with the one or more volumes and/or one or more descriptions associated with the one or more volumes. In some embodiments, the volume identifier data structure is received from a data steward device 306 or an information owner device 304. In some embodiments, the volume identifier data structure is received via user interaction with the interface 400 illustrated in FIG. 4.

Embodiments herein include means, such as the data identity registration module 206 for generating volume metadata comprising one or more items of data representative of, for example, dataset identifiers associated with the volume. In this regard, each dataset identifier may be associated with a dataset belonging to at least one of the indicated volumes. The data identity registration module 206 stores the volume metadata. In some embodiments, the volume metadata is stored by updating existing volume metadata associated with each of the one or more volumes. The updates to the existing volume metadata to reflect that the dataset belongs to the one or more volumes and all of the data stored in the volume metadata may be stored in the volume metadata.

In some embodiments, timestamp data associated with creation of dataset, modification of dataset, creation of volume, modification of volume, and/or other actions taken toward volume and/or dataset may be recorded and stored as part of, or associated with, the corresponding volume metadata. Such timestamp data may be retrieved in association with various provided sorting, searching, data processing, and/or auditing functionality, or the like.

In some embodiments, the volume metadata further includes one or more dataset status indications representative of one or more statuses of the one or more datasets (e.g., whether the dataset is published or not), a description associated with the volume, and other information associated with the volume.

Embodiments herein include means, such as data identity registration module 206 executed by processing circuitry, for attaching one or more assets to the one or more volumes in accordance with some example embodiments. The data identity registration module 206 receives an asset registration data structure associated with one or more assets. The asset registration data structure may comprise one or more volume identifiers, one or more asset identifiers, one or more business owner identifiers associated with the one or more asset identifiers, one or more IT owner identifiers associated with the one or more asset identifiers, and/or the like. The asset registration data structure may further include data representative of what type of data the asset stores or processes. An example interface 600 configured to receive asset registration data structures used for attaching an asset to a volume is illustrated in FIG. 6.

The one or more assets may store, under the permission of the data identity registration module 206, the one or more datasets of each of the one or more volumes based on the asset registration data structure. In some such embodiments, the asset integrates with a data protection system, for example the data protection system 106, for authorization. In this regard, in some such embodiments, the data protection system 106 functions as the enforcement point with regard to such authorization. The data protection system 106 may be configured to retrieve and/or otherwise receive data attribute protection policies and/or individual data permissions of use information for use in determining whether to provide authorization. In some such embodiments, the data protection system 106 is configured to communicate with a data rights tracking system, such as a data rights tracking system 104, for retrieving such information allocated to the one or more assets.

The data identity registration module 206 may generate asset metadata. The asset metadata comprises one or more items of data associated with an asset identifier. For example, asset metadata may comprise one or more of the elements of the asset registration data structure described above. For example, asset metadata may comprise one or more dataset identifiers associated with the asset identifier. The asset metadata may comprise one or more volume identifiers associated with the asset identifier. The asset metadata may further comprise one or more additional asset identifiers representative of assets associated or somehow related to the asset identified by the asset identifier.

The data identity registration module 206 may store the asset metadata. In some embodiments, the asset metadata is stored by updating existing volume metadata associated with each of the one or more volumes. In some embodiments, timestamp data associated with attaching each of the one or more assets to each of the one or more volumes may be recorded and stored in the asset metadata. Such timestamp data may be retrieved in association with various provided sorting, searching, data processing, and/or auditing functionality, or the like.

Embodiments herein include means, such as permissions of use registration module 208 executed by processing circuitry, for registering dataset or volume permissions of use information associated with a dataset or volume in accordance with some example embodiments. The permissions of use registration module 208 receives dataset and/or volume permissions of use information. In some embodiments, dataset or volume permissions of use information may be received from a data steward device 306.

In some embodiments, dataset permissions of use information may include allowed account types, allowed environments, allowed use, allowed use justifications, indication of offshore allowed, protection consumption profile, and record authorization for a given dataset identifier. In some embodiments, volume permissions of use information may include allowed account types, allowed environments, allowed use, allowed use justifications, indication of offshore allowed, protection consumption profile, and record authorization for a given volume identifier. Examples of use justifications may include treatment, payment, operations and regulatory. Example types of accounts include a service account, an end user account, a system account, or the like. Example types of allowed use include analytics, enrichments, consumption, provision, or the like. In some embodiments, the volume permissions of use information and dataset permissions of use information may further include an indication of required training to gain access, such as a unique identifier or a link associated with the training. In some embodiments, dataset permissions of use information and volume permissions of use information may further include unique identifiers of permitted or restricted end users.

FIG. 7 illustrates an exemplary interface 700 configured to receive a user input including dataset permissions of use information. The interface 700 may be presented and/or otherwise rendered at a data steward device 306, for example to a display associated with the data steward device 306 via a network portal. As illustrated in FIG. 7, the interface 700 includes input fields configured to receive user inputs for various permissions of use details such as allowed account types, allowed environments, allowed use, allowed use justifications, indication of offshore allowed, protection consumption profile, and record authorization.

The permissions of use registration module 208 generates dataset or volume permissions of use metadata based on the dataset or volume permissions of use information. All data included in the dataset or volume permissions of use information may be included in the dataset or volume permissions of use metadata. The permissions of use registration module 208 stores the dataset/volume permissions of use metadata. The dataset/volume permissions of use metadata may be stored by updating existing volume detail information associated with each of the one or more volumes. Dataset permissions of use metadata may be stored as associated with the particular dataset within the volume.

Embodiments herein include means, such as communications circuitry 210, input/output circuitry 212, or the like, for receiving one or more data attributes associated with the dataset from the metadata repository 102B. The data attributes are attribute classifications associated with the dataset. Example attributes may be associated with PHI and/or specific sensitive data to be accessible based on policies and/or permissions. In one such example context, example attributes indicate: whether the dataset include social security numbers, whether the dataset include health insurance claim numbers, whether the dataset include biometric identifiers, whether the dataset include genomic data, whether the dataset include names, or whether the dataset include Medicare beneficiary identifiers.

Embodiments herein include means, such as communications circuitry 210, input/output circuitry 212, or the like, for receiving one or more data attribute protection policies associated with the one or more data attributes. The one or more data attribute protection policies may be received from a defined source of truth. For example, in some embodiments, one or more end user devices may be utilized to provide such policies. In other embodiments, the defined source of truth may include data retrieved from one or more predefined and/or dynamically determined datastores upon configuration of the apparatus 200. The apparatus 200 includes means, such as communications circuitry 210, input/output circuitry 212, or the like, for enforcing the one or more data attribute protection policies associated with the one or more data attributes by transmitting the one or more data attribute protection policies to the data protection system 106. The data protection system 106 is configured to enforce the one or more data attribute protection policies on the one or more assets. Therefore, the attribute protection policies serves a layer of protection of the dataset that targets the assets.

In some embodiments, the data attribute protection policies are retrievable for enforcement via one or more API communications with one or more associated systems, devices, datastores, and/or the like. In this regard, the apparatus 200 may provide an endpoint for such API requests. The API endpoint may provide such data attribute protection policies through processing a specially configured query received that includes an asset identifier, and optionally a volume identifier and/or a publish date. For example, in some example embodiments, the endpoint is configured for processing API request queries configured in the format of:
GET/attributeprotections/
{assetID}?volumeID={volumeID}&
publishDate={publishDate}

In response to such a query, response data may be received. The response data may include structured and/or unstructured data embodying identified attribution protection policies. For example, in some embodiments, the response data includes the attribution protection policies represented using extensible markup language (XML), or a similar schema-based data representation.

Similarly, in some embodiments, the apparatus 200 may similarly function as an endpoint for proper use identifier(s) one or more user identifiers and/or corresponding role identifiers for an end user identifier. In this regard, the apparatus 200 may provide an endpoint for such API requests. The API endpoint may provide such proper use identifiers through processing another specially configured query received that includes a role identifier (e.g., a particular persona identifier). For example, in some example embodiments, the endpoint is configured for processing proper use API request queries configured in the format of:
GET/properuses/{roleIdentifier}

In response to such a proper use query, response data may be similarly received. The response data may include structured and/or unstructured data embodying identified proper use identifiers and/or associated proper use data. For example, in some embodiments, the response data includes the proper use information represented using XML, or a similar schema-based data representation.

Similarly, in some embodiments, the apparatus 200 may similarly function as an endpoint for various access restriction and/or boundary data associated with data access, for example as usage rules associated with one or more various and/or corresponding dataset(s). In this regard, the apparatus 200 may provide an endpoint for such API requests. The API endpoint may provide such usage rule-related data through processing another specially configured query received that may include and/or be associated with one or more role identifiers. For example, in some example embodiments, the endpoint is configured for processing intended use API request queries configured in the format of:
GET/intendeduses In response to such an intended use query, response data may be similarly received. The response data may include structured and/or unstructured data embodying usage rule-related data. For example, in some embodiments, the response data includes the usage rule-related data represented using XML, or a similar schema-based data representation.

Similarly, in some embodiments, the apparatus 200 may similarly function as an endpoint for various authorized use data associated with a particular asset identifier. In this regard, the apparatus 200 may provide an endpoint for such API requests. The API endpoint may provide such authorized use data through processing another specially configured query received that may include and/or be associated with an asset identifier. For example, in some example embodiments, the endpoint is configured for processing authorized use API request queries configured in the format of:
GET/authorized/{assetID}

In response to such an authorized use query, response data may be similarly received. The response data may include structured and/or unstructured data embodying authorized use data. For example, in some embodiments, the response data includes the authorized use data represented using XML, or a similar schema-based data representation.

In some embodiments, the proper use module 216 may present one or more search interfaces configured to provide search capabilities of dataset and volume permissions of use information to an end user device 308. An example search interface 800 is provided in FIG. 8. As illustrated in FIG. 8, the example search interface 800 includes various search criteria including volume, dataset, asset, environment type, use justification, or the like. Permissions of use information and various metadata associated with the volumes and datasets are presented.

Embodiments herein include means, such as permissions of use registration module 208, data identity registration module 206, proper use module 216, and data asset authority logic module 214, or any combination thereof, executed by processing circuitry, for registering a persona data object. A registered persona data object may be linked to one or more user identity and/or user profile(s) to configure access control based on persona information for the linked data object. In this regard, for example, a user identifier may be associated with a persona identifier to link the user profile and/or user identity to the persona data object. The modules receive persona information. In some embodiments, the persona information may be received from a data steward device 306.

In some embodiments, persona information includes one or more data objects and/or identifiers associated with controlled access to stored data for allowed uses. In this regard, in some embodiments, the persona information includes restrictions to be imposed on the user with which the persona data object is assigned, or otherwise linked (e.g., and to be used when determining if such a user may access certain requested data by comparing the restrictions with permissions of use information upon request by a user). Additionally or alternatively, the persona information may include permissions of use information. Additionally or alternatively, in some embodiments, the persona information includes allowed use identifier(s). Additionally or alternatively, in some embodiments, the persona information includes allowed account type identifier(s). Additionally or alternatively, in some embodiments, the persona information includes accessible volume identifier(s) and/or accessible dataset identifier(s).

FIG. 9 illustrates an exemplary interface 900 configured to receive a user input including persona information. Further, the interface 900 may be configured for submission of the persona information, for example for draft storing, and/or publishing, for example for generation of a corresponding persona data object. The interface 900 may be presented and/or otherwise rendered at a data steward device 306, for example to a display associated with the data steward device 306 via a network portal. As illustrated in FIG. 9, the interface 900 includes input fields configured to receive user inputs for various allowed uses, allowed user identity/identities, and accessible data. It should be appreciated that these inputs may be provided via any number of interface elements having various known interface element types (e.g., picker views, checkboxes, multi-select tools, and/or the like).

In embodiments, the modules generate a persona data object based on the persona information. In this regard, the persona data object may include the persona information and/or associated identifiers linked to the data objects for access control. Additionally or alternatively, the modules may generate metadata associated with the persona information and include the metadata in the persona data object. The modules store the persona data object. The persona data object may be stored such that it is retrievable using the corresponding persona identifier. In this regard, the stored persona data object may be assignable (or otherwise linked) to one or more user identity and/or user profile(s). When a a particular end user attempts to access data through a corresponding user profile that is linked to a particular generated persona identifier, for example, access control may be processed and provided based on the persona data object corresponding to the linked persona identifier.

Embodiments herein include means, such as permissions of use registration module 208, data identity registration module 206, proper use module 216, and data asset authority logic module 214, or any combination thereof, executed by processing circuitry, for providing an access control descriptive interface associated with a particular user profile. In this regard, the access control descriptive interface may provide various information associated with allowable access to a user associated with a particular user profile and/or user identity/identities. For example, the interface may be displayed to the user via a display associated with an end user device, and the interface may include summary data associated with the user profile (e.g., biographical information, identifier information, user identity information, and/or the like) and/or allowed control. The allowed control may be based on one or more personas linked to the user profile and/or user identities, such that information for accessed control may be derived therefrom.

In embodiments, the modules receive a user profile identifier. The user profile identifier may be received in response to one or more transmission from an end user device. For example, an end user may begin an authenticated session by authenticating with the apparatus 200, and/or an associated system, to begin accessing functionality described herein. In some such embodiments, the user, via the end user device, may access a particular interface element indicating a request to have access control information displayed, and transmit a corresponding request to the apparatus 200. In some such embodiments, the user profile identifier may be parsed from the request. In other embodiments, the user profile identifier is input by the user.

In embodiments, the modules identify at least one persona identifier associated with the user profile identifier. In some embodiments, the persona identifiers are identified by querying one or more datastores storing data embodying links between persona identifier(s) and user profile identifier(s). In this regard, the retrieved persona identifiers may have been associated with (e.g., linked to) the user profile by a data steward and/or other administrative user.

In embodiments, the modules derive data access information based on the at least one persona identifier. In some embodiments, each associated persona identifier corresponds to a persona data object. The persona data object may include persona information embodying various data access information, for example permissions of use information and/or accessible volume identifiers. Additionally or alternatively, portions of persona information may be processed to derive other data access information based on one or more business rules. For example, such derived information may include accessible datasets based on accessible volume identifiers, or the like based on the persona information for each persona data object associated with an identified persona identifier In embodiments, the modules cause rendering of at least the data access information. In some embodiments, the data access information is rendered additionally with user profile information and/or other summary information associated with a user profile. The data access information may be rendered to an access control descriptive interface (e.g., a "My Data Rights" interface) that includes interface elements including data access information viewable by a user. Additionally or alternatively, interface elements may be included for filtering rendered data, sorting rendered data, searching rendered data, and/or otherwise adjusting the interface based on specific information desired by the user. The interface may be rendered to a display associated with an end user device, for example associated with a transmission for receiving the user profile identifier at an earlier operation. In this regard, the modules may cause rendering by generating, configuring, and/or transmitting a response transmission including at least the data access information. In this regard, the "My Data Rights" interface provides, for a user associated with a particular user account, information regarding the potential data access available to the user based on the defined permissions and rules. In one example context, where no permissions of use or other data rights have been granted, a user may be presented with an empty selection grid (e.g., a blank selection grid).

FIG. 10 illustrates an exemplary interface 1000 configured to include such data access information. As illustrated, the interface 1000 further includes user profile information. The interface 1800 includes persona information (e.g., persona identifiers) identified associated with the user profile. Additionally or alternatively, the interface 1000 includes allowed use data and allowed use justifications data associated with, included in, or derived from linked persona data objects. Additionally or alternatively, the interface 1000 includes protection consumption profile data, identifiers, and/or the like associated with, included in, or otherwise derived from the linked persona data objects. Further, in some embodiments, the interface 1000 includes attached dataset information. In some embodiments, one or more of the rendered data is based on or included in retrieved proper use information retrieved based on linked persona identifiers.

Additionally or alternatively, interface 1000 includes one or more interface elements associated with requesting data access. In some such embodiments, a data access playbook interface element may be provided. The data access playbook interface element may provide the end user with steps to be performed, for example via the system, for requesting such permissible access. Further, it should be appreciated that such step data may be identified based on the linked persona identifiers.

FIGS. 11-12 illustrate an example logical data record or logical data record set, for use with embodiments of the present disclosure. In FIG. 11, logical data record set 1100 comprises a plurality of rows 1102A-1102N and a plurality of columns 1104A-1104N. Each data row (e.g., 1102A-1102N) includes content, where each cell of the data row includes metadata associated with the content. Each data column represents structure or meaning associated with data contained therein. In FIG. 12, a data column may be considered a structure differentiated by attributes, while a data row contains content that is differentiated by tagging. That is, column differentiators may be associated with attributes for which data use obligations are to be considered or enforced while row differentiators may be associated with content that is tagged in order for data use obligations to be considered or enforced.

FIG. 13 illustrates an example logical data record, for use with embodiments of the present disclosure. In FIG. 13, A dataset 1302 of a plurality of datasets (not shown) may comprise an intersection of a plurality of rows 1304 (e.g., horizontal dimensions) and a plurality of columns 1306 (e.g., vertical dimensions). The plurality of rows 1304 may be part of an overall population 1308 of rows of data, and the overall population 1308 of data may have associated therewith various subpopulations 1310 that are associated with various data use obligations. A given subpopulation 1310 associated with a data use obligation or particular differentiators may be referred to herein as a sample or a logical data record or logical data record set. The plurality of columns 1306 may be part of an overall domain 1312 of columns of data, and the overall domain 1312 of data may have associated therewith various schema 1314 as described herein.

FIG. 14 illustrates an example row differentiator filtering, according to various embodiments of the present disclosure. Shown in FIG. 14, each dataset has a set of row differentiators, and each consumer has a set of permissions corresponding to the set of differentiators. In FIG. 14, a filter rule can be applied based on differentiators known at the row level. For example, if a row differentiator is associated with a bit value of "1" and a permission value is associated with a bit value of "1," then the record may be allowed to pass for whatever request has been received (e.g., access to the record may be granted).

FIG. 15 illustrates an example field level differentiator filtering, according to various embodiments of the present disclosure. FIG. 15 illustrates an example where the column permissions or differentiator may be used as a filter. Shown in FIG. 15, each field has a set of column differentiators (e.g., in this example three differentiators include safe harbor risk group, confidential, and PHI), and each consumer has a set of permissions associated with the differentiators. For example, the permission in FIG. 15 for "SSN" may theoretically allow a consumer to access actual SSNs in any column that has a logical SSN tag set to a bit value of "1." Further shown in FIG. 15, one differentiator set may apply to each field (e.g., there are four fields depicted in FIG. 15). For example, if a field or column differentiator is associated with a bit value of "1" and a permission value is associated with a bit value of "1," then the value of the record may be allowed to pass for whatever request has been received (e.g., access to an actual value of the record may be granted).

FIG. 16 illustrates an example coarse record filtering, according to various embodiments of the present disclosure. Shown in FIG. 16, each dataset has a set of row differentiators, and each consumer has a set of permissions corresponding to the set of differentiators, however the differentiator values may only be known at the dataset level, so a filter rule can be applied based on differentiators known at the dataset level. For example, if a dataset differentiator is associated with a bit value of "1" and a permission value is associated with a bit value of "1," then the entire dataset may be allowed to pass for whatever request has been received (e.g., access to the entire dataset may be granted).

FIG. 17 illustrates an example coarse field level filtering, according to various embodiments of the present disclosure. Shown in FIG. 17, each dataset or field has a set of column differentiators, and each consumer has a set of permissions corresponding to the set of differentiators, however the differentiator values may only be known at the dataset level, so a filter rule can be applied based on differentiators known at the dataset level. For example, if a dataset differentiator is associated with a bit value of "1" and a permission value is associated with a bit value of "1," then the entire dataset may be allowed to pass for whatever request has been received (e.g., access to the entire dataset may be granted).

FIG. 18 illustrates an example graph structure for use with embodiments of the present disclosure. In embodiments, an example graph structure 1800 (e.g., a cross-link relationship graph structure) comprises a plurality of nodes (e.g., cross-link relationship graph nodes) Node A 1802A, Node B 1802B, Node C 1802C, Node D 1802D, Node E 1802E, and Node F 1802F. Each node of the plurality of nodes may be connected to another node of the plurality of nodes by way of one or more edges of a plurality of edges (e.g., cross-link relationship graph edges) Edge AB 1804AB, Edge AC 1804AC, Edge AD 1804AD, Edge BC 1804BC, Edge BG 1804BG, Edge CD 1804CD, Edge DE 1804DE, Edge EF 1804EF, Edge DF 1804DF, and Edge DG 1804DG. That is, Node A 1802A may be connected to or associated with Node B 1802B by way of Edge AB 1804AB. Node A 1802A may be connected to or associated with Node C 1802C by way of Edge AC 1804AC. Node A 1802 may be connected to or associated with Node D 1802D by way of Edge AD 1804AD. Node B 1802B may be connected to or associated with Node C 1802C by way of Edge BC 1804BC and may be connected to or associated with Node G 1802G by way of Edge GB 1804BG. Node G 1802G may be connected to or associated with Node D 1802D by way of Edge DG 1804DG. Node C 18002C may be connected to or associated with Node D 1802D by way of Edge CD 1804CD. Node F 1802F may be connected to or associated with Node D 1802D by way of Edge DF 1804DF and with Node E 1802E by way of Edge EF 1804EF. Node D 1802D may be connected to or associated with Node E 1802E by way of Edge DE 1804DE. It will be appreciated that selection of names of edges herein involving any ordering of node references (e.g., Node X and Node Y connected by Edge XY) does not represent any particular ordering for the purposes of limiting scope of the embodiments herein. That is, Edge XY may be interchangeable with Edge YX for the purposes of various embodiments of the present disclosure without departing from the scope herein.

FIG. 19 illustrates an example graph structure according to embodiments of the present disclosure. In FIG. 19, an example graph structure 1900 comprises a plurality of nodes (e.g., cross-link relationship graph nodes) representing logical data records or logical data record sets, including nodes 1902A (e.g., "Provider" as part of a Network, where the Network represents facilities for which a Provider or supplier, that a health insurer or plan has contracted with, to provide a healthcare Product or Service to enrolled Individuals), 1902B (e.g., "Product or Service" as part of the Network), 1902C (e.g., "Individual" as part of the Network), 1902D (e.g., "Administrator" as part of a Plan, where the Plan is a benefit an employer, union or other group sponsor (e.g., Customer) provides to pay for healthcare services), 1902E (e.g., "Customer" as part of the Plan), 1902F (e.g., "Carrier" as part of a Business, where the Business is the organization that holds healthcare insurance policy plans), and 1902G (e.g., "Purchaser"). Each of the nodes 1902A-1902G may be related to one another according to one or more relationships. Examples of relationships include, without limitation, an underwriter relationship (e.g., a party that evaluates and assumes risk for a given healthcare product or service), an administrative services only (ASO) relationship (e.g., an arrangement by which an organization funds its own benefit plan and hires an outside firm to perform specific administrative services), a third party relationship (e.g., a person or company selected to manage a carrier's benefits plan(s)), a broker relationship (e.g., a person or business licensed and regulated for enrolling a consumer into an issuer's plans), a direct contract relationship (e.g., enrollment of a consumer into an issuer's plan without an intermediary), a member relationship (e.g., an individual enrolled in and covered by a benefit plan; also known as an enrollee or beneficiary), a claim relationship (e.g., a request by a policy holder for coverage of a covered policy event; third parties can file claims on behalf of the insured policy holder), adjudication relationship (e.g., a process of paying claims submitted, or denying payment, after comparing claims to the benefit or the coverage requirements), or a clinical relationship (e.g., events related to the medical examination and treatment of individual parties).

Referring back to FIG. 19, node 1902A (e.g., "Provider") is related to node 1902C (e.g., "Individual") according to a clinical relationship, represented by edge 1904AC. Node 1902A (e.g., "Provider") is related to node 1902D (e.g., "Administrator") according to an adjudication relationship, represented by edge 1904AD. Node 1902B (e.g., "Product or Service") is related to node 1902D (e.g., "Administrator") according to a claim relationship, represented by edge 1904BD. Node 1902C (e.g., "Individual") is related to node 1902E (e.g., "Customer") according to a member relationship, represented by edge 1904CE. Node 1902B (e.g., "Product or Service") is related to node 1902G (e.g., "Purchaser") according to a broker relationship, represented by edge 1904BG, and is related to node 1902E (e.g., "Customer") according to a direct contract relationship, represented by edge 1904BE. Node 1902G (e.g., "Purchaser") is related to node 1902E (e.g., "Customer) according to a contract relationship, represented by edge 1904GE. Node 1902E (e.g., "Customer") is related to node 1902F (e.g., Carrier) according to an administrative services only (ASO) relationship, represented by edge 1904EF. Node 1902F (e.g., "Carrier") is related to node 1902D (e.g., "Administrator") according to a third party relationship, represented by edge 1904DF. Node 1902F (e.g., "Carrier") is related to node 1902B (e.g., "Product or Service") according to an underwriter relationship, represented by edge 1904BF. Node 1902E (e.g., "Customer") is related to node 1902D (e.g., "Administrator") according to a third party relationship, represented by edge 1904DE.

Also shown in FIG. 19, various data usage rule gathering points (e.g., representing data use obligations) exist throughout the example graph structure 1900. For example, shown by reference "1" associated with edges 1904GE and 1904BE, contract based data usage is identified which may be considered a binding data use obligation. Further, shown by reference "2" associated with edge 1903CE, client based usage (e.g., preferences) are identified as data use obligations. Shown by reference "3" also associated with edge 1904CE, individual or person based data obligations are identified (e.g., GDPR, HIPAA). Shown by reference "4" and associated with edges 1904AD, 1904BD, and 1904BF, business strategic based (e.g., proprietary) data use obligations are identified. Shown by reference "5" and associated with record sets or datasets in general (e.g., Network, Plan, Business), regulatory based (e.g., state breach notifications, state privacy laws) data use obligations are identified. Shown by reference "6" and associated with record sets or datasets in general (e.g., Network, Plan, Business), internal company based (e.g., internal restrictions on co-worker data) data use obligations are identified.

Relationships in FIG. 19 are represented by the aforementioned edges, and each edge (e.g., cross-link relationship) may be associated with a cross-link relationship type. Examples of cross-link relationship types include direct and indirect. In FIG. 19, edge 1904DF, representing a third party relationship, may be considered an indirect cross-link relationship, as may edge 1904EF, representing an administrative services only (ASO) relationship (e.g., as depicted with dashed arrow lines). The remaining edges, depicted with solid arrow lines, may be considered direct cross-link relationships.

FIG. 20 illustrates example components to controlled data usage, according to embodiments of the present disclosure. In FIG. 20, a data asset 2002 comprises data attributes according to column dimensions (e.g., structure) and data tags according to row dimensions (e.g., content). Each of a plurality of consumers, Consumer A, Consumer B, and Consumer C may be interested in using data of the data asset 2002 for various intended uses or applications. As a first filter, each of Consumer A, Consumer B, and Consumer C may have varying individual permissions associated with data of the data asset 2002. Subsequent a determination that, for example, Consumer A may have permission to access a sample or logical data record set 2002A representing a subset of the data of data asset 2002, Consumer A's requested intended use is compared against rules (e.g., data use obligations) associated with data record set 2002A. For example, Consumer A's intended use for the data maybe Offshore IT Operations. Data record set 2002A may include a row "content" tagging rule (e.g., data use obligation) indicating Offshore Allowed (e.g., data in the rows of data record set 2002A may all be considered available for Offshore Operations). However, data record set 2002A may also have a column "structure" attribute rule (e.g., data use obligation) requiring SSN Tokenization. That is, if data from data record set 2002A will be used for offshore purposes, social security numbers must be tokenized.

Continuing with the example from FIG. 20, subsequent a determination that, for example, Consumer B may have permission to access a sample or logical data record set 2002B representing a subset of the data of data asset 2002, Consumer B's requested intended use is compared against rules (e.g., data use obligations) associated with data record set 2002B. For example, Consumer B's intended use for the data may be Analytics. Data record set 2002B may include a row "content" tagging rule (e.g., data use obligation) indicating Research Allowed (e.g., data in the rows of data record set 2002B may all be considered available for Research). Data record set 2002B may further have a column "structure" attribute rule (e.g., data use obligation) indicating that social security numbers do not need to be tokenized for the purposes of research. However, data record set 2002B may have a column "structure" attribute rule (e.g., data use obligation) whereby certain columns are confidential (e.g., Confidential Denied) when the intended use is research and therefore access to them is denied.

Continuing with the example from FIG. 20, subsequent a determination that, for example, Consumer C may have permission to access a sample or logical data record set 2002C representing a subset of the data of data asset 2002, Consumer C's requested intended use is compared against rules (e.g., data use obligations) associated with data record set 2002C. For example, Consumer C's intended use for the data may be Standardization. Data record set 2002C may include no row "content" tagging rules (e.g., data use obligations) nor column "structure" attribute rules (e.g., data use obligations) when the intended use is standardization. Therefore, all of data record set 2002C may be used by Consumer C for standardization.

FIG. 21 illustrates example operations associated with embodiments of the present disclosure. In FIG. 21, a "Data Obligation Abstraction" module generates data use obligation scores as described herein (e.g., a score may be a confidence score ranging from 0 to 100, representing a confidence that a data use obligation applies to a given record set within a dataset). The data use obligation score (e.g., otherwise referred to as a data obligation abstraction) is passed along to be considered along with a rule (e.g., a data obligation rule) associated with a specific application or intended use of the data of the given record set within the data set. A "Data Obligation Rule" module governs usage of data based on applications (e.g., or intended uses or data use pattern) for data, by evaluating a data use obligation score against a risk threshold associated with the application (e.g., or intended use or data use pattern) for the data. If the data use obligation score is below a risk threshold associated with the application (e.g., or intended use or data use pattern), the decision making entity (e.g., owner or steward of the data, an enterprise, a business, or the like as described herein) is willing to accept a risk of the level of likelihood (e.g., a data obligation score) that a data use obligation applies to the given data record for the given application. Otherwise, the application or intended use or data use pattern is denied access to the given data record.

FIG. 22 illustrates example operations associated with embodiments of the present disclosure. In example embodiments, operations 2200 include retrieving 2202 a cross-link relationship graph structure from a data repository. In embodiments, the cross-link relationship graph structure comprises a plurality of cross-link relationship graph nodes connected by a plurality of cross-link relationship graph edges. In embodiments, each cross-link relationship graph node is associated with a unique logical data record set identifier of a plurality of logical data record set identifiers associated with a dataset identifier.

In example embodiments, operations 2200 further include, for each unique logical data record set identifier, traversing 2204 the cross-link relationship graph structure, and, based at least in part on a separation measure associated with each cross-link relationship of one or more cross-link relationships associated with the unique logical data record set identifier, generating one or more data use obligation scores for the unique logical data record set identifier.

FIG. 23 illustrates example operations associated with embodiments of the present disclosure. In example embodiments, operations 2300 include retrieving 2302, from a repository, one or more logical data record set identifiers associated with an intended use request. In embodiments, the intended use request is associated with an intended use identifier.

In example embodiments, operations 2300 further include, for each unique logical data record set identifier of the one or more logical data record set identifiers, traversing 2304 a cross-link relationship graph structure comprising a plurality of cross-link relationship graph nodes and a plurality of cross-link relationship graph edges, and, based at least in part on a separation measure associated with each cross-link relationship of one or more cross-link relationships associated with the unique logical data record set identifier, generating one or more data use obligation scores for the unique logical data record set identifier. In some embodiments, the one or more data use obligation scores are generated based at least in part on the separation measure and the intended use identifier.

In example embodiments, operations 2300 further include generating 2306 an aggregated data use obligation score by aggregating the one or more data use obligation scores for each of the unique logical data record set identifiers of the one or more logical data record set identifiers associated with the intended use request.

In example embodiments, operations 2300 further include, upon determining that the aggregated data use obligation score is below a risk threshold, granting 2308 the intended use request.

In example embodiments, one or more of the aggregated data use obligation score by aggregating or a data use obligation scores may be associated as data record set metadata for each of the unique logical data record set identifiers of the one or more logical data record set identifiers associated with the intended use request.

In example embodiments, a count of one or more of aggregated data use obligation scores exceeding the risk threshold is maintained in the repository for a given logical data record set identifier. In example embodiments, another (e.g., different) count of data use obligation scores exceeding one or more of a risk threshold or an intended use threshold is maintained in the repository for the given logical data record set identifier.

Example embodiments may include, upon detecting that one or more of the first count or the second count exceeds a score calculation count threshold, one or more of generating an alert flag for one or more of the given logical data record set identifier or the intended use request or adjusting data use permissions associated with the given logical data record set identifier or a user identifier associated with the intended use request.

FIG. 24 illustrates example data flow associated with embodiments of the present disclosure. In FIG. 24, an example data flow illustrates data movement associated with pulling or retrieval of data records by a given requester or target application. A first application may have a platform existing thereon. The first application may interface with a data policy via a data interface, where the data policy is associated with a given data activity (e.g., a requested data usage). A second application, that may be governed by one or more business rules, may request data records that are part of its data target, which is associated with the data policy. The first application may own access control to the requested data, and the second application may own authentication of access to the data. Access to the data is linked to one or more data sets of the data policy.

The data policy may include one or more data sets (e.g., logical), which are each made of record sets (e.g., content) and schema (e.g., structure). Each record set (e.g., content)

may have one or more records (e.g., logical) which are represented as rows (e.g., physical) contained by the record set. Each row (e.g., physical) may have therein a data asset or data instance. Each schema (e.g., structure) may have one or more attributes (e.g., logical) which are represented by columns (e.g., physical). each column (e.g., physical) may have therein a data asset or data instance. Access to the data asset or data instance is controlled by the access control owned by the first application.

FIG. 25 illustrates example data flow associated with embodiments of the present disclosure. In FIG. 25, an example data flow illustrates data movement associated with pushing or storage of data records by a given requester or target application. A first application may have a platform existing thereon. The first application may interface with a data policy via a data interface, where the data policy is associated with a given data activity (e.g., a requested data usage). A second application, that may be governed by one or more business rules, may receive a request to modify data records that are part of its data target, which is associated with the data policy. The second application may own access control to the requested data, and the first application may own authentication of access to the data. Access to the data is linked to one or more data sets of the data policy.

The data policy may include one or more data sets (e.g., logical), which are each made of record sets (e.g., content) and schema (e.g., structure). Each record set (e.g., content) may have one or more records (e.g., logical) which are represented as rows (e.g., physical) contained by the record set. Each row (e.g., physical) may have therein a data asset or data instance. Each schema (e.g., structure) may have one or more attributes (e.g., logical) which are represented by columns (e.g., physical). each column (e.g., physical) may have therein a data asset or data instance. Access to the data asset or data instance is controlled by the access control owned by the second application.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In various embodiments, an apparatus comprises at least one processor and at least one memory including program code that with the processor, cause the apparatus to retrieve a cross-link relationship graph structure from a data repository. In some of these embodiments, the cross-link relationship graph structure comprises a plurality of cross-link relationship graph nodes connected by a plurality of cross-link relationship graph edges. In some of these embodiments, each cross-link relationship graph node is associated with a unique logical data record set identifier of a plurality of logical data record set identifiers associated with a dataset identifier. In some of these embodiments, the apparatus is further caused to, for each unique logical data record set identifier, traverse the cross-link relationship graph structure, and based at least in part on a separation measure associated with each cross-link relationship of one or more cross-link relationships associated with the unique logical data record set identifier, generate one or more data use obligation scores for the unique logical data record set identifier.

In some of these embodiments, a data use obligation score represents a likelihood that a data use obligation is associated with the unique logical data record set identifier. In some of these embodiments, a data use obligation comprises one or more data use restrictions associated with one or more data record identifiers associated with the unique logical data record set identifier. In some of these embodiments, the separation measure is based at least in part on a degree of separation between any two given cross-link relationship graph nodes. In some of these embodiments, the degree of separation is associated with a number of cross-link relationship graph edges that exist between the two given cross-link relationship graph nodes. In some of these embodiments, a first cross-link relationship graph node of the plurality of cross-link relationship graph nodes is connected to at least a second cross-link relationship graph node of the plurality of cross-link relationship graph nodes by way of at least a cross-link relationship graph edge of the plurality of cross-link relationship graph edges. In some of these embodiments, the cross-link relationship graph edge represents a cross-link relationship associated with the first cross-link relationship graph node and the second cross-link relationship graph node.

In some of these embodiments, a logical data record set comprises a plurality of columns and a plurality of rows. In some of these embodiments, a logical data record set comprises one or more of one or more row differentiators or one or more column differentiators.

In some of these embodiments, a row differentiator represents a first data use obligation for data included in a given row. In some of these embodiments, the first data use obligation is based at least in part on one or more first data use obligation policies. In some of these embodiments, a column differentiator represents a second data use obligation for data in a given column. In some of these embodiments, the second data use obligation is based at least in part on one or more second data use obligation policies.

In some of these embodiments, the dataset identifier is associated with one or more dataset differentiators. In some of these embodiments, a dataset differentiator represents a third data use obligation for data within the dataset, wherein the third data use obligation is based at least in part on permitted intended data use identifiers.

In various embodiments, a computer-implemented method comprises retrieving a cross-link relationship graph structure from a data repository In some of these embodiments, the cross-link relationship graph structure comprises a plurality of cross-link relationship graph nodes connected by a plurality of cross-link relationship graph edges In some of these embodiments, each cross-link relationship graph node is associated with a unique logical data record set identifier of a plurality of logical data record set identifiers associated with a dataset identifier. In some of these embodiments, the method further comprises, for each unique logical data record set identifier, traversing the cross-link relationship graph structure. In some of these embodiments, the method further comprises, based at least in part on a separation measure associated with each cross-link relationship of one or more cross-link relationships associated with the unique logical data record set identifier, generating one or more data use obligation scores for the unique logical data record set identifier.

In some of these embodiments, a data use obligation score represents a likelihood that a data use obligation is associated with the unique logical data record set identifier. In some of these embodiments, a data use obligation comprises one or more data use restrictions associated with one or more data record identifiers associated with the unique logical data record set identifier. In some of these embodiments, the separation measure is based at least in part on a degree of separation between any two given cross-link relationship graph nodes. In some of these embodiments, the degree of separation is associated with a number of cross-link relationship graph edges that exist between the two given cross-link relationship graph nodes. In some of these embodiments, a first cross-link relationship graph node of the plurality of cross-link relationship graph nodes is connected to at least a second cross-link relationship graph node of the plurality of cross-link relationship graph nodes by way of at least a cross-link relationship graph edge of the plurality of cross-link relationship graph edges. In some of these embodiments, the cross-link relationship graph edge represents a cross-link relationship associated with the first cross-link relationship graph node and the second cross-link relationship graph node.

In some of these embodiments, a logical data record set comprises a plurality of columns and a plurality of rows. In some of these embodiments, a logical data record set comprises one or more of one or more row differentiators or one or more column differentiators.

In some of these embodiments, a row differentiator represents a first data use obligation for data included in a given row. In some of these embodiments, the first data use obligation is based at least in part on one or more first data use obligation policies. In some of these embodiments, a column differentiator represents a second data use obligation for data in a given column. In some of these embodiments, the second data use obligation is based at least in part on one or more second data use obligation policies.

In some of these embodiments, the dataset identifier is associated with one or more dataset differentiators. In some of these embodiments, a dataset differentiator represents a third data use obligation for data within the dataset, wherein the third data use obligation is based at least in part on permitted intended data use identifiers.

In various embodiments, a computer program product comprises at least one non-transitory computer readable storage medium comprising computer code that, when executed by an apparatus, configure the apparatus to retrieve a cross-link relationship graph structure from a data repository. In some of these embodiments, the cross-link relationship graph structure comprises a plurality of cross-link relationship graph nodes connected by a plurality of cross-link relationship graph edges. In some of these embodiments, each cross-link relationship graph node is associated with a unique logical data record set identifier of a plurality of logical data record set identifiers associated with a dataset identifier. In some of these embodiments, the apparatus is further configured to, for each unique logical data record set identifier, traverse the cross-link relationship graph structure, and based at least in part on a separation measure associated with each cross-link relationship of one or more cross-link relationships associated with the unique logical data record set identifier, generate one or more data use obligation scores for the unique logical data record set identifier.

In some of these embodiments, a data use obligation score represents a likelihood that a data use obligation is associated with the unique logical data record set identifier. In some of these embodiments, a data use obligation comprises one or more data use restrictions associated with one or more data record identifiers associated with the unique logical data record set identifier. In some of these embodiments, the separation measure is based at least in part on a degree of separation between any two given cross-link relationship graph nodes. In some of these embodiments, the degree of separation is associated with a number of cross-link relationship graph edges that exist between the two given cross-link relationship graph nodes. In some of these embodiments, a first cross-link relationship graph node of the plurality of cross-link relationship graph nodes is connected to at least a second cross-link relationship graph node of the plurality of cross-link relationship graph nodes by way of at least a cross-link relationship graph edge of the plurality of cross-link relationship graph edges. In some of these embodiments, the cross-link relationship graph edge represents a cross-link relationship associated with the first cross-link relationship graph node and the second cross-link relationship graph node.

In some of these embodiments, a logical data record set comprises a plurality of columns and a plurality of rows. In some of these embodiments, a logical data record set comprises one or more of one or more row differentiators or one or more column differentiators.

In some of these embodiments, a row differentiator represents a first data use obligation for data included in a given row. In some of these embodiments, the first data use obligation is based at least in part on one or more first data use obligation policies. In some of these embodiments, a column differentiator represents a second data use obligation for data in a given column. In some of these embodiments, the second data use obligation is based at least in part on one or more second data use obligation policies.

In some of these embodiments, the dataset identifier is associated with one or more dataset differentiators. In some of these embodiments, a dataset differentiator represents a third data use obligation for data within the dataset, wherein the third data use obligation is based at least in part on permitted intended data use identifiers.

In various embodiments, an apparatus comprises at least one processor and at least one memory including program code that with the processor, cause the apparatus to retrieve, from a repository, one or more logical data record set identifiers associated with an intended use request, the intended use request associated with an intended use identifier. In some of these embodiments, the apparatus is further caused to, for each unique logical data record set identifier of the one or more logical data record set identifiers, traverse a cross-link relationship graph structure comprising a plurality of cross-link relationship graph nodes and a plurality of cross-link relationship graph edges, and based at least in part on a separation measure associated with each cross-link relationship of one or more cross-link relationships associated with the unique logical data record set identifier, generate one or more data use obligation scores for the unique logical data record set identifier. In some of these embodiments, the apparatus is further caused to generate an aggregated data use obligation score by aggregating the one or more data use obligation scores for each of the unique logical data record set identifiers of the one or more logical data record set identifiers associated with the intended use request. In some of these embodiments, the apparatus is further caused to, upon determining that the aggregated data use obligation score is below a risk threshold, grant the intended use request.

In some of these embodiments, the risk threshold represents an acceptable level of likelihood that data use obligations will apply to one or more of the one or more logical data record set identifiers associated with the intended use request.

In some of these embodiments, the risk threshold is based at least in part on the intended use identifier.

In some of these embodiments, the risk threshold is based at least in part on specific data use obligations associated with one or more of the one or more logical data record set identifiers.

In some of these embodiments, the risk threshold is based at least in part on dependencies between row differentiators and column differentiators of one or more of the one or more logical data record set identifiers.

In some of these embodiments, a first cross-link relationship graph node of the plurality of cross-link relationship graph nodes is connected to a second cross-link relationship graph node of the plurality of cross-link relationship graph nodes by way of at least a cross-link relationship graph edge of the plurality of cross-link relationship graph edges.

In some of these embodiments, the cross-link relationship graph edge represents a cross-link relationship associated with the first cross-link relationship graph node and the second cross-link relationship graph node.

In some of these embodiments, the apparatus is further caused to, upon determining that the aggregated data use obligation score exceeds the risk threshold, deny the intended use request.

In some of these embodiments, a data use obligation score represents a likelihood that a data use obligation is associated with the unique logical data record set identifier.

In some of these embodiments, a data use obligation comprises one or more data use restrictions associated with one or more data record identifiers associated with the unique logical data record set identifier.

In some of these embodiments, one or more of the aggregated data use obligation score by aggregating or a data use obligation scores is associated as data record set metadata for each of the unique logical data record set identifiers of the one or more logical data record set identifiers associated with the intended use request.

In some of these embodiments, a first count of one or more of aggregated data use obligation scores exceeding the risk threshold is maintained in the repository for a given logical data record set identifier. In some of these embodiments, a second count of data use obligation scores exceeding one or more of a risk threshold or an intended use threshold is maintained in the repository for the given logical data record set identifier.

In some of these embodiments, the apparatus is further caused to, upon detecting that one or more of the first count or the second count exceeds a score calculation count threshold, one or more of generate an alert flag for one or more of the given logical data record set identifier or the intended use request or adjust data use permissions associated with the given logical data record set identifier or a user identifier associated with the intended use request.

In various embodiments, a computer-implemented method comprises retrieving, from a repository, one or more logical data record set identifiers associated with an intended use request, the intended use request associated with an intended use identifier. In some of these embodiments, the method further comprises, for each unique logical data record set identifier of the one or more logical data record set identifiers, traversing a cross-link relationship graph structure comprising a plurality of cross-link relationship graph nodes and a plurality of cross-link relationship graph edges, and, based at least in part on a separation measure associated with each cross-link relationship of one or more cross-link relationships associated with the unique logical data record set identifier, generating one or more data use obligation scores for the unique logical data record set identifier. In some of these embodiments, the method further comprises generating an aggregated data use obligation score by aggregating the one or more data use obligation scores for each of the unique logical data record set identifiers of the one or more logical data record set identifiers associated with the intended use request. In some of these embodiments, the method further comprises, upon determining that the aggregated data use obligation score is below a risk threshold, granting the intended use request.

In some of these embodiments, the risk threshold represents an acceptable level of likelihood that data use obligations will apply to one or more of the one or more logical data record set identifiers associated with the intended use request.

In some of these embodiments, the risk threshold is based at least in part on the intended use identifier.

In some of these embodiments, the risk threshold is based at least in part on specific data use obligations associated with one or more of the one or more logical data record set identifiers.

In some of these embodiments, the risk threshold is based at least in part on dependencies between row differentiators and column differentiators of one or more of the one or more logical data record set identifiers.

In some of these embodiments, a first cross-link relationship graph node of the plurality of cross-link relationship graph nodes is connected to a second cross-link relationship graph node of the plurality of cross-link relationship graph nodes by way of at least a cross-link relationship graph edge of the plurality of cross-link relationship graph edges.

In some of these embodiments, the cross-link relationship graph edge represents a cross-link relationship associated with the first cross-link relationship graph node and the second cross-link relationship graph node.

In some of these embodiments, method further comprises, upon determining that the aggregated data use obligation score exceeds the risk threshold, denying the intended use request.

In some of these embodiments, a data use obligation score represents a likelihood that a data use obligation is associated with the unique logical data record set identifier.

In some of these embodiments, a data use obligation comprises one or more data use restrictions associated with one or more data record identifiers associated with the unique logical data record set identifier.

In some of these embodiments, one or more of the aggregated data use obligation score by aggregating or a data use obligation scores is associated as data record set metadata for each of the unique logical data record set identifiers of the one or more logical data record set identifiers associated with the intended use request.

In some of these embodiments, a first count of one or more of aggregated data use obligation scores exceeding the risk threshold is maintained in the repository for a given logical data record set identifier. In some of these embodiments, a second count of data use obligation scores exceeding one or more of a risk threshold or an intended use threshold is maintained in the repository for the given logical data record set identifier.

In some of these embodiments, the method further comprises, upon detecting that one or more of the first count or the second count exceeds a score calculation count threshold, one or more of generating an alert flag for one or more of the given logical data record set identifier or the intended use request or adjusting data use permissions associated with the given logical data record set identifier or a user identifier associated with the intended use request.

In various embodiments, computer program product comprises at least one non-transitory computer readable storage medium comprising computer code that, when executed by an apparatus, configure the apparatus to retrieve, from a repository, one or more logical data record set identifiers associated with an intended use request, the intended use request associated with an intended use identifier. In some of these embodiments, the apparatus is further configured to, for each unique logical data record set identifier of the one or more logical data record set identifiers, traverse a cross-link relationship graph structure comprising a plurality of cross-link relationship graph nodes and a plurality of cross-link relationship graph edges, and based at least in part on a separation measure associated with each cross-link relationship of one or more cross-link relationships associated with the unique logical data record set identifier, generate one or more data use obligation scores for the unique logical data record set identifier. In some of these embodiments, the apparatus is further configured to generate an aggregated data use obligation score by aggregating the one or more data use obligation scores for each of the unique logical data record set identifiers of the one or more logical data record set identifiers associated with the intended use request. In some of these embodiments, the apparatus is further configured to, upon determining that the aggregated data use obligation score is below a risk threshold, grant the intended use request.

In some of these embodiments, the risk threshold represents an acceptable level of likelihood that data use obligations will apply to one or more of the one or more logical data record set identifiers associated with the intended use request.

In some of these embodiments, the risk threshold is based at least in part on the intended use identifier.

In some of these embodiments, the risk threshold is based at least in part on specific data use obligations associated with one or more of the one or more logical data record set identifiers.

In some of these embodiments, the risk threshold is based at least in part on dependencies between row differentiators and column differentiators of one or more of the one or more logical data record set identifiers.

In some of these embodiments, a first cross-link relationship graph node of the plurality of cross-link relationship graph nodes is connected to a second cross-link relationship graph node of the plurality of cross-link relationship graph nodes by way of at least a cross-link relationship graph edge of the plurality of cross-link relationship graph edges.

In some of these embodiments, the cross-link relationship graph edge represents a cross-link relationship associated with the first cross-link relationship graph node and the second cross-link relationship graph node.

In some of these embodiments, the apparatus is further configured to, upon determining that the aggregated data use obligation score exceeds the risk threshold, deny the intended use request.

In some of these embodiments, a data use obligation score represents a likelihood that a data use obligation is associated with the unique logical data record set identifier.

In some of these embodiments, a data use obligation comprises one or more data use restrictions associated with one or more data record identifiers associated with the unique logical data record set identifier.

In some of these embodiments, one or more of the aggregated data use obligation score by aggregating or a data use obligation scores is associated as data record set metadata for each of the unique logical data record set identifiers of the one or more logical data record set identifiers associated with the intended use request.

In some of these embodiments, a first count of one or more aggregated data use obligation scores exceeding the risk threshold is maintained in the repository for a given logical data record set identifier. In some of these embodiments, a second count of data use obligation scores exceeding one or more of a risk threshold or an intended use threshold is maintained in the repository for the given logical data record set identifier.

In some of these embodiments, the apparatus is further configured to, upon detecting that one or more of the first count or the second count exceeds a score calculation count threshold, one or more of generate an alert flag for one or more of the given logical data record set identifier or the intended use request or adjust data use permissions associated with the given logical data record set identifier or a user identifier associated with the intended use request.

CONCLUSION

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. An apparatus comprising one or more processors and at least one memory including program code that with the one or more processors, cause the apparatus to:
retrieve one or more logical data record set identifiers associated with an intended use request, the intended use request associated with an intended use identifier;
for each unique logical data record set identifier of the one or more logical data record set identifiers,
(a) traverse a cross-link relationship graph structure, wherein the cross-link relationship graph structure comprises a plurality of cross-link relationship graph nodes, each cross-link relationship graph node of the plurality of cross-link relationship graph nodes is (1) connected to at least one of a plurality of cross-link relationship graph edges and (2) associated with a respective logical data record set identifier of the one or more logical data record set identifiers associated with the intended use request;
(b) based at least in part on a separation measure associated with each cross-link relationship of one or more cross-link relationships associated with the unique logical data record set identifier, generate one or more data use obligation scores for the unique logical data record set identifier, wherein the one or more data use obligation scores represent a likelihood that one or more data use obligations apply to a logical data record or logical data record set associated with the unique logical data record set identifier; and
(c) generate an aggregated data use obligation score by aggregating the one or more data use obligation scores; and
responsive to determining that the aggregated data use obligation score is below a risk threshold, grant the intended use request.

2. The apparatus of claim 1, wherein the risk threshold represents an acceptable level of likelihood that data use obligations apply to one or more of the one or more logical data record set identifiers associated with the intended use request.

3. The apparatus of claim 1, wherein the risk threshold is based at least in part on the intended use identifier.

4. The apparatus of claim 1, wherein the risk threshold is based at least in part on specific data use obligations associated with one or more of the one or more logical data record set identifiers.

5. The apparatus of claim 1, wherein the risk threshold is based at least in part on dependencies between row differentiators and column differentiators of one or more of the one or more logical data record set identifiers.

6. The apparatus of claim 1, wherein a first cross-link relationship graph node of the plurality of cross-link relationship graph nodes is connected to a second cross-link relationship graph node of the plurality of cross-link relationship graph nodes by way of at least a cross-link relationship graph edge of the plurality of cross-link relationship graph edges.

7. The apparatus of claim 6, wherein the cross-link relationship graph edge represents a cross-link relationship associated with the first cross-link relationship graph node and the second cross-link relationship graph node.

8. The apparatus of claim 1, wherein the at least one memory including program code, with the one or more processors, further cause the apparatus to:
responsive to determining that the aggregated data use obligation score exceeds the risk threshold, deny the intended use request.

9. The apparatus of claim 1, wherein a data use obligation score represents a likelihood that a data use obligation is associated with the unique logical data record set identifier.

10. The apparatus of claim 9, wherein the data use obligation comprises one or more data use restrictions associated with one or more data record identifiers associated with the one or more logical data record set identifier.

11. The apparatus of claim 1, wherein one or more of the aggregated data use obligation score or data use obligation score is associated as data record set metadata for each of the one or more logical data record set identifiers.

12. The apparatus of claim 11, wherein a first count of one or more of aggregated data use obligation scores exceeding the risk threshold is stored for a given logical data record set identifier.

13. The apparatus of claim 12, wherein a second count of data use obligation scores exceeding one or more of the risk threshold or an intended use threshold is stored for the given logical data record set identifier.

14. The apparatus of claim 13, wherein the at least one memory including program code, with the one or more processors, further cause the apparatus to:
responsive to detecting that one or more of the first count or the second count exceeds a score calculation count threshold, one or more of generate an alert flag for one or more of the given logical data record set identifier or the intended use request or (ii) adjust data use permissions associated with the given logical data record set identifier or a user identifier associated with the intended use request.

15. A computer-implemented method, comprising:
retrieving one or more logical data record set identifiers associated with an intended use request, the intended use request associated with an intended use identifier;
for each unique logical data record set identifier of the one or more logical data record set identifiers,
(a) traversing a cross-link relationship graph structure, wherein the cross-link relationship graph structure comprises a plurality of cross-link relationship graph nodes, each cross-link relationship graph node of the plurality of cross-link relationship graph nodes is (1) connected to at least one of a plurality of cross-link relationship graph edges, and (2) associated with a respective logical data record set identifier of the one or more logical data record set identifiers associated with the intended use request;
(b) based at least in part on a separation measure associated with each cross-link relationship of one or more cross-link relationships associated with the unique logical data record set identifier, generating one or more data use obligation scores for the unique logical data record set identifier, wherein the one or more data use obligation scores represent a likelihood that one or more data use obligations apply to a logical data record or logical data record set associated with the unique local data record set identifier; and
(c) generating an aggregated data use obligation score by aggregating the one or more data use obligation scores; and responsive to determining that the aggregated data use obligation score is below a risk threshold, granting the intended use request.

16. The method of claim 15, wherein the risk threshold represents an acceptable level of likelihood that data use obligations apply to one or more of the one or more logical data record set identifiers associated with the intended use request.

17. The method of claim 15, wherein the risk threshold is based at least in part on the intended use identifier.

18. The method of claim 15, wherein the risk threshold is based at least in part on specific data use obligations associated with one or more of the one or more logical data record set identifiers.

19. The method of claim 15, wherein the risk threshold is based at least in part on dependencies between row differentiators and column differentiators of one or more of the one or more logical data record set identifiers.

20. The method of claim 15, wherein a first cross-link relationship graph node of the plurality of cross-link relationship graph nodes is connected to a second cross-link relationship graph node of the plurality of cross-link relationship graph nodes by way of at least a cross-link relationship graph edge of the plurality of cross-link relationship graph edges.

21. The method of claim 20, wherein the cross-link relationship graph edge represents a cross-link relationship associated with the first cross-link relationship graph node and the second cross-link relationship graph node.

22. The method of claim 15, further comprising:
responsive to determining that the aggregated data use obligation score exceeds the risk threshold, denying the intended use request.

23. The method of claim 15, wherein a data use obligation score represents a likelihood that a data use obligation is associated with the unique logical data record set identifier.

24. The method of claim 23, wherein the data use obligation comprises one or more data use restrictions associated with one or more data record identifiers associated with the unique logical data record set identifier.

25. The method of claim 15, wherein one or more of the aggregated data use obligation score or data use obligation score is associated as data record set metadata for each of the one or more logical data record set identifiers.

26. The method of claim 15, wherein a first count of one or more of aggregated data use obligation scores exceeding the risk threshold is stored for a given logical data record set identifier.

27. The method of claim 26, wherein a second count of data use obligation scores exceeding one or more of the risk threshold or an intended use threshold is stored for the given logical data record set identifier.

28. The method of claim 27, further comprising:
responsive to detecting that one or more of the first count or the second count exceeds a score calculation count threshold, one or more of (i) generating an alert flag for one or more of the given logical data record set identifier or the intended use request or (ii) adjusting data use permissions associated with the given logical data record set identifier or a user identifier associated with the intended use request.

29. A computer program product comprising at least one non-transitory computer readable storage medium comprising computer code that, when executed by an apparatus, configure the apparatus to:
retrieve one or more logical data record set identifiers associated with an intended use request, the intended use request associated with an intended use identifier;
for each unique logical data record set identifier of the one or more logical data record set identifiers,
(a) traverse a cross-link relationship graph structure, wherein the cross-link relationship graph structure comprises a plurality of cross-link relationship graph nodes, each cross-link relationship graph node of the plurality of cross-link relationship graph nodes is (1) connected to at least one of a plurality of cross-link relationship graph edges, and (2) associated with a respective logical data record set identifier of the one or more logical data record set identifiers associated with the intended use request;
(b) based at least in part on a separation measure associated with each cross-link relationship of one or more cross-link relationships associated with the unique logical data record set identifier, generate one or more data use obligation scores for the unique logical data record set identifier, wherein the one or more data use obligation scores represent a likelihood that one or more data use obligations apply to a logical data record or logical data record set associated with the unique logical data record set identifier; and
(c) generate an aggregated data use obligation score by aggregating the one or more data use obligation scores; and
responsive to determining that the aggregated data use obligation score is below a risk threshold, grant the intended use request.

* * * * *

UNITED STATES PATENT AND TRADEMARK OFFICE
CERTIFICATE OF CORRECTION

PATENT NO. : 11,734,351 B2
APPLICATION NO. : 17/204728
DATED : August 22, 2023
INVENTOR(S) : Daniel L. Binkley et al.

It is certified that error appears in the above-identified patent and that said Letters Patent is hereby corrected as shown below:

In the Claims

In Column 46, Line 13, Claim 10, delete "one or more logical" and insert -- unique logical --, therefor.

In Column 46, Line 32, Claim 14, delete "more of generate" and insert -- more of (i) generate --, therefor.

Signed and Sealed this
Thirtieth Day of January, 2024

Katherine Kelly Vidal
*Director of the United States Patent and Trademark Office*